US007839522B2

(12) United States Patent
Ohara et al.

(10) Patent No.: US 7,839,522 B2
(45) Date of Patent: Nov. 23, 2010

(54) USER IDENTIFICATION BASED IMAGE PROCESSING SYSTEM

(75) Inventors: Kiyotaka Ohara, Nagoya (JP); Makoto Matsuda, Aisai (JP); Masafumi Miyazawa, Nagoya (JP); Masatoshi Kokubo, Aichi-ken (JP); Kazuma Aoki, Kasugai (JP); Satoru Yanagi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1151 days.

(21) Appl. No.: 11/262,971

(22) Filed: Nov. 1, 2005

(65) Prior Publication Data

US 2006/0126110 A1 Jun. 15, 2006

(30) Foreign Application Priority Data

Nov. 5, 2004 (JP) ............................. 2004-322944

(51) Int. Cl.
*G06F 3/12* (2006.01)
(52) U.S. Cl. .................................................... 358/1.15
(58) Field of Classification Search ................ 358/1.15; 399/8; 709/201, 202, 203, 220, 223, 224
See application file for complete search history.

(56) References Cited

U.S. PATENT DOCUMENTS

| 5,909,602 | A | 6/1999 | Nakai et al. | |
| 5,946,457 | A | 8/1999 | Nakai et al. | |
| 6,335,966 | B1 * | 1/2002 | Toyoda | 379/100.06 |
| 6,983,415 | B2 | 1/2006 | Shima | |
| 2002/0004802 | A1 * | 1/2002 | Shima | 707/513 |
| 2002/0143861 | A1 * | 10/2002 | Greene et al. | 709/203 |
| 2003/0117642 | A1 | 6/2003 | Haraguchi | |
| 2004/0098471 | A1 | 5/2004 | Shima | |

FOREIGN PATENT DOCUMENTS

| EP | 0 782 326 | | 7/1997 |
| JP | 9-238215 | A | 9/1997 |
| JP | 10-326288 | A | 12/1998 |
| JP | 2000-200247 | A | 7/2000 |
| JP | 2001-357055 | A | 12/2001 |
| JP | 2002-259335 | A | 9/2002 |
| JP | 2003-345579 | A | 12/2003 |
| JP | 2004-78392 | A | 3/2004 |
| WO | WO-02/08860 | | 1/2002 |
| WO | WO-2004/091188 | | 10/2004 |

OTHER PUBLICATIONS

JP OA dtd Sep. 24, 2008, JP Appln. 2004-322944.

* cited by examiner

*Primary Examiner*—Benny Q Tieu
*Assistant Examiner*—Eric A Rust
(74) *Attorney, Agent, or Firm*—Banner & Witcoff, Ltd.

(57) ABSTRACT

An image processing system includes an image processing device including at least one of an image reading unit which reads an image and generates image data representing the image and an image printing unit which prints an image represented by image data; and a service supply unit provided on a network to be accessible from the image processing device using location information indicating a location on the network, and configured to execute a service regarding at least one of image data generated by the image reading unit and image data representing an image to be printed by the image printing unit in response to a request from the image processing device.

16 Claims, 22 Drawing Sheets

```
<ID>11111110</ID>
<Title>Directory Service</Title>
<Type>MENU</Type>
<Num_Link>3</Num_Link>
<Link>
  <Link_Title>Data Storage Service</Link_Title>
  <Link_Location>11111111</Link_Location>
</Link>
<Link>
  <Link_Title>Printing Service </Link_Title>
  <Link_Location>11111112</Link_Location>
</Link>
<Link>
  <Link_Title>Copy Application Service</Link_Title>
  <Link_Location>11111113</Link_Location>
</Link>
```

FIG. 3

```
<ID>11111113</ID>
<Title>Copy Application Service</Title>
<Type>MENU</Type>
<Num_Link>4</Num_Link>
<Link>
  <Link_Title>Watermarked Copy</Link_Title>
    <Link_Location>http://suk.example.co.jp/cgi_bin/suktop</Link_Location>
</Link>
<Link>
  <Link_Title>Translation Copy </Link_Title>
    <Link_Location>http://hon.example.co.jp/cgi_bin/top</Link_Location>
</Link>
<Link>
  <Link_Title>Document Read-aloud</Link_Title>
    <Link_Location>http://example.yomiage.com/cgi_bin/yomi</Link_Location>
</Link>
<Link>
  <Link_Title>Voice-text Conversion</Link_Title>
    <Link_Location>http://ototeki.com/cgi_bin/oo</Link_Location>
</Link>
```

FIG. 4

|  | Data Name | Data Type | Remarks |
|---|---|---|---|
| Basic Data | ID | Integer | ID of service definition information |
|  | Title | Character String | Display title |
|  | Type | "MENU" or "FORM" | The type of Body data<br>MENU:link list to other information<br>FORM:data input form<br>The "Type" is "MENU" in service definition information. |
| Body Data (When Type is "MENU") | Num_Link | Integer | The number of Link data |
|  | Link[ ] | – | Link data |
| Link Data | Link_Title | Character String | Character string displayed for explaining service or information at the link |
|  | Link_Location | Character String | URL for calling up service or ID of other service definition information |

FIG. 5

```
<ID>11111110</ID>
<Title>Translation Copy</Title>
<Type>FORM</Type>
<Action>
http://hon.example.co.jp/cgi_bin/service</Action>
<Num_Form_Elem>4</Num_Form_Elem>
<Form_Elem>
  <Form_Type>Select</Form_Type>
  <Form_Data>
    <Disp_Name>Language Selection</Disp_Name>
    <Value_Name>lang</Value_Name>
    <Multi_Select>0</Multi_Select>
    <Num_Option>2</Num_Option>
    <Option>
      <Disp_Select>English → Japanese</Disp_Select>
      <Disp_Value>en_ja</Disp_Value>
      <Default_Select>1</Disp_Select>
    </Option>
    <Option>
      <Disp_Select>Japanese → English</Disp_Select>
      <Disp_Value>ja_en</Disp_Value>
      <Default_Select>0</Disp_Select>
    </Option>
    </Disp_Name>
  </Form_Data>
</Form_Elem>
(Continued on Fig.8)
```

FIG. 7

```
(Continued from Fig.7)
<Form_Elem>
  <Form_Type>Select</Form_Type>
  <Form_Data>
    <Disp_Name>Scanner Setting</Disp_Name>
    <Value_Name>scan_res</Value_Name>
    <Multi_Select>0</Multi_Select>
    <Num_Option>2</Num_Option>
    <Option>
      <Disp_Select>Normal Character</Disp_Select>
      <Disp_Value>300</Disp_Value>
      <Default_Select>1</Disp_Select>
    </Option>
    <Option>
      <Disp_Select>Small Character</Disp_Select>
      <Disp_Value>600</Disp_Value>
      <Default_Select>0</Disp_Select>
    </Option>
  </Form_Data>
</Form_Elem>
(Continued on Fig.9)
```

FIG. 8

(Continued from Fig.8)
```
<Form_Elem>
  <Form_Type>Select</Form_Type>
  <Form_Data>
    <Disp_Name>Print Setting</Disp_Name>
    <Value_Name>print_res</Value_Name>
    <Multi_Select>0</Multi_Select>
    <Num_Option>3</Num_Option>
    <Option>
      <Disp_Select>Print Speed Priority</Disp_Select>
      <Disp_Value>200</Disp_Value>
      <Default_Select>0</Disp_Select>
    </Option>
    <Option>
      <Disp_Select>Normal</Disp_Select>
      <Disp_Value>300</Disp_Value>
      <Default_Select>1</Disp_Select>
    </Option>
    <Option>
      <Disp_Select>High-resolution</Disp_Select>
      <Disp_Value>600</Disp_Value>
      <Default_Select>0</Disp_Select>
    </Option>
  </Form_Data>
</Form_Elem>
<Form_Elem>
  <Form_Type>Text</Form_Type>
  <Form_Data>
    <Disp_Name>Comment</Disp_Name>
    <Value_Name>comment<Value_Name>
    <Max_Byte>100</Max_Byte>
    <Default_String></Default_String>
  </Form_Data>
</Form_Elem>
```

FIG. 9

| | Data Name | Data Type | Remarks |
|---|---|---|---|
| Basic Data | ID | Integer | ID of service I/F information |
| | Title | Character String | Display title |
| | Type | "MENU" or "FORM" | The type of Body data<br>MENU:link list to other information<br>FORM:data input form<br>The "Type" is "FORM" in service I/F information. |
| Body Data (When Type is "FORM") | Action | URL Character String | URL of program receiving and processing input data |
| | Num_Form_Elem | Integer | The number of Form_Elem's |
| | Form_Elem[ ] | – | Type-dependent Form element data |
| Form_Elem Data (Form element data) | Form_Type | "Text", "Passeord" or "Select" | The type of Form element |
| | Form_Data | – | Type-dependent data |
| Form_Data Data ("Text" or "Password") | Disp_Name | Character String | Character string for explaining entry item |
| | Value_Name | Character String | Name of variable when transmitted as data |
| | Max_Byte | Integer | The maximum number of bytes of character string entered |
| | Default_String | Character String | Character string displayed in input area in initial state |
| Form_Data Data (Select) | Disp_Name | Character String | Character string for explaining entry item |
| | Value_Name | Character String | Name of variable when transmitted as data |
| | Multi_Select | 0 or 1 | 0:multiple selection impossible<br>1:multiple selection possible |
| | Num_Option | Integer | The number of options |
| | Option[ ] | – | Information on options |
| Option Data | Disp_Select | Character String | Character string displayed for indicating option |
| | Disp_Value | Character String | Value when transmitted as data when selected |
| | Default_Select | 0 or 1 | 0:not selected in initial state<br>1:selected in initial state |

FIG.10

| Registration Name | Service Execution Unit URL | User ID |
|---|---|---|
| Translation Copy Service | http://bbb/ccc/ | 8765 |
| Extra News Printing Service | http://eee/fff/ | 6295 |
| Voucher Sorting Service | http://ggg/hhh/ | 9476 |

FIG.12A

| One-touch Key Number | Function Type | Service Execution Unit URL | User ID | FAX number |
|---|---|---|---|---|
| 1 | iMFC | http://xxx/yyy/ | 1265 | |
| 2 | FAX | | | 052-123-6789 |
| 3 | iMFC | http://zzz/aaa/ | 3689 | |

FIG.12B

| Function Key Name | Service Execution Unit URL | User ID |
|---|---|---|
| Scan | http://bbb/ccc/ | 8765 |
| Copy | http://eee/fff/ | 6295 |
| FAX | http://ggg/hhh/ | 9476 |

FIG.12C

| User ID | Parameter |
|---|---|
| 9865 | 200dpi, 600dpi, English → French |
| 4356 | 300dpi, 300dpi, English → Geman |
| 1863 | 200dpi, 300dpi, English → Japanese |

FIG.13

USER IDENTIFICATION BASED IMAGE PROCESSING SYSTEM

CROSS-REFERENCE TO RELATED APPLICATION

This application claims priority under 35 U.S.C. §119 from Japanese Patent Application No. 2004-322944, filed on Nov. 5, 2004. The entire subject matter of the application is incorporated herein by reference.

FIELD

Aspects of the present invention relate to an image processing system for executing processes regarding images, an image processing device and a server forming the image processing system, and a program for implementing processes executed by the server.

BACKGROUND

A system comprising a digital copier and a host computer provided with functions that the digital copier does not have and connected to the digital copier via a network has been proposed in Japanese Patent Provisional Publication No. HEI09-238215.

In the system of the patent document, the digital copier transmits bit data (including command codes for control, image data (density data), etc.) to the host computer. The host computer receiving the bit data analyzes the received command codes and executes image processing to the image data according to image editing functions that have been specified for the image data. The image data processed by the host computer as above is returned to the digital copier and printed by the digital copier.

In the system, when one or more new functions are added to the host computer, information on the new functions is sent from the host computer to the digital copier. The digital copier receiving the information allows the user to select some of the new functions that should be registered in the digital copier, that is, some of the new functions that the user hopes to use. In short, the user of the system is allowed to use some of the new functions of the host computer by registering the desired functions in the digital copier.

However, the above system is unsuitable for environments in which the number of services randomly increases and decreases from day to day (like general servers on the Internet).

Specifically, since each function added to the host computer becomes available to the user when the user registers the function in the digital copier in the system explained above in environments (like general servers on the Internet) in which various types of services are added and removed frequently, the user has to carry out the registration of functions in the digital copier very often with an increasing amount of information to be registered.

Especially when there are a great variety of services, the task of selecting a necessary service from all the services becomes more and more troublesome to the user as the number or variety of services increases. Further, the task of inputting various parameters necessary for receiving the selected service also becomes more and more tiresome to the user as the number or variety of parameters increases. The user having to carry out the troublesome task of selecting a service from a variety of services and the setting of necessary parameters upon each execution of a frequently-used service is extremely inefficient.

SUMMARY

Aspects of the present invention are advantageous in that an image processing system can be provided which is capable of eliminating the need for the user to carry out the troublesome task of selecting a service from a variety of services and setting parameters necessary for receiving the selected service upon each execution of the service for frequently-used services.

BRIEF DESCRIPTION OF THE ACCOMPANYING DRAWINGS

FIG. 3 is an explanatory drawing showing an example of a data structure of top service definition information in accordance with aspects of the present invention.

FIG. 4 is an explanatory drawing showing an example of a data structure of service definition information of a copy application service in accordance with aspects of the present invention.

FIG. 5 is a table indicating definitions of tags which are used in the service definition information in accordance with aspects of the present invention.

FIGS. 7 to 9 are explanatory drawings showing an example of a data structure of service IF information corresponding to a translation copy service in accordance with aspects of the present invention.

FIG. 10 is a table indicating definitions of tags which are used in the service IF information in accordance with aspects of the present invention.

FIGS. 12A to 12C are tables showing three types of tables in which bookmark information of the MFP is registered in accordance with aspects of the present invention.

FIG. 13 is a table showing an example of a data structure of a user-designated parameter storage unit of a function server of the image processing system in accordance with aspects of the present invention.

DETAILED DESCRIPTION

Figure 1:
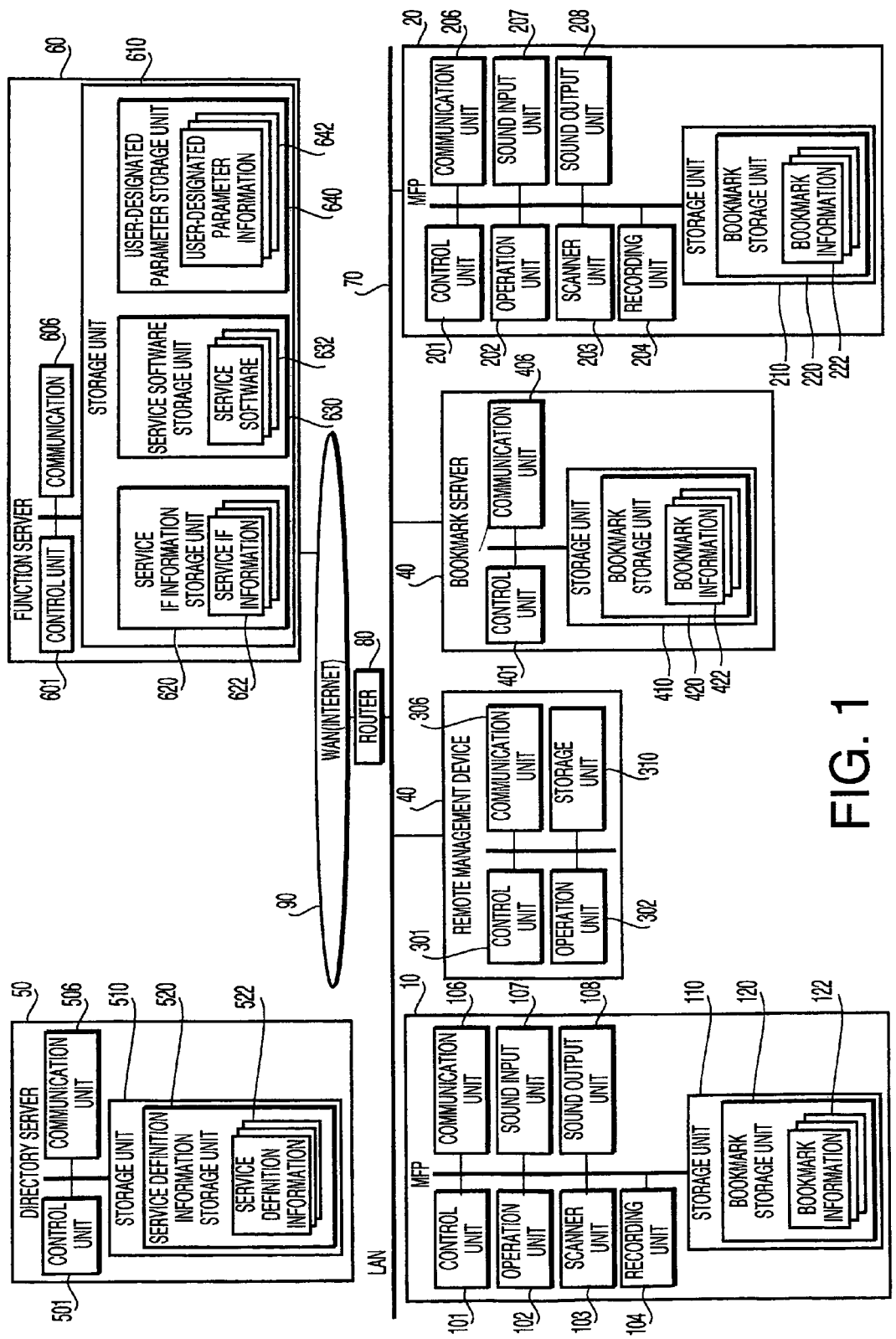
FIG. 1 is a block diagram showing the overall composition of an image processing system in accordance with aspects of the present invention.

General Overview of Aspects of the Invention

It is noted that various connections are set forth between elements in the following description. It is noted that these connections in general and unless specified otherwise, may be direct or indirect and that this specification is not intended to be limiting in this respect.

In accordance with an aspect of the present invention, there is provided an image processing system comprising: an image processing device including at least one of an image reading unit which reads an image and generates image data representing the image and an image printing unit which prints an image represented by image data; and a service supply unit provided on a network to be accessible from the image processing device using location information indicating a location on the network, configured to execute a service regarding at least one of image data generated by the image reading unit and image data representing an image to be printed by the image printing unit in response to a request from the image processing device. The image processing device includes: a bookmark information storage unit configured to store a combination of the location information and parameter information as a piece of bookmark information including parameters set by a user or information convertible into the parameters by the service supply unit; a selection unit which allows the user select a piece of bookmark information from the bookmark information stored in the bookmark information storage unit; and a service requesting unit which requests the service supply unit to execute a service by accessing the service supply unit using the location information included in the bookmark information selected by the user while transmitting the parameter information included in the selected bookmark information to the service supply unit. The service supply unit executes the service according to the parameters, based on the parameter information transmitted from the image processing device.

In the above image processing system, the "image processing device" can be, for example, an image printing device (e.g. printer), an image reading device (e.g. scanner), a facsimile machine or an MFP (Multi Function Peripheral) having such functions. The "service regarding image data generated by the image reading unit" may include a process of modifying or processing an image represented by the image data generated by the image reading unit (scaling up/down, reversal, translation, etc.), a process of converting text included in the image represented by the image data to voice, a process of storing the image data in a storage unit (e.g. server) which is provided separately from the image processing device, etc. The "service regarding image data representing an image to be printed by the image printing unit" may include a process of modifying or processing the image data to be printed by the image printing unit (scaling up/down, reversal, translation, etc.), a process of converting voice into a text image represented by the voice, a process of converting information existing on the Internet satisfying a designated condition to a print image, etc. Meanwhile, the "service supply unit" can be implemented by, for example, a server on a network. In this case, the service supply unit may either be implemented by a single server or multiple servers.

In the image processing device of the image processing system configured as above, when the user selects a piece of bookmark information from the bookmark information stored in the bookmark information storage unit through the selection unit, the service requesting unit requests the service supply unit to execute a service by accessing the service supply unit using the location information included in the bookmark information selected by the user while transmitting the parameter information included in the selected bookmark information to the service supply unit. The location information specifies the location of resources existing on the network, such as a URL (Uniform Resource Locator) on the Internet. The service supply unit executes the service according to the parameters based on the parameter information transmitted from the image processing device.

With the image processing system configured as above, the location information necessary for accessing the service supply unit for a service and the parameter information necessary for the execution of the service are stored in the bookmark information storage unit as a piece of bookmark information. Therefore, by registering the bookmark information on frequently-used services, the user is allowed to request a desired service only by selecting a piece of bookmark information so as to let the image processing device access the service supply unit using the location information included in the selected bookmark information without the need of selecting a service from a variety of services supplied by the service supply unit. Further, the user can receive the service according to the parameter information included in the selected bookmark information without the need of inputting various parameters (necessary for receiving the service) each time.

In another aspect, the bookmark information storage unit is configured to store pieces of bookmark information including the same location information and differing parameter information.

With the image processing system configured as above, even when the location of resources on the network (as the destination of the request for a service) is the same and part of the parameters necessary for the execution of the service can vary, pieces of bookmark information including the same location information and differing parameter information can be stored in the bookmark information storage unit as separate pieces of bookmark information. Therefore, differently from cases where only one set of parameters can be registered corresponding to a location on the network, any number of pieces of bookmark information for services having different parameters can be stored in the bookmark information storage unit which is convenient for users frequently using such services.

In another aspect, the network is provided with: a parameter input information transmission unit which transmits parameter input information to the image processing device, to be used for allowing the user to input the parameters; a parameter reception unit which receives the parameters transmitted from the image processing device; a parameter storage unit which stores the parameters received by the parameter reception unit and associates the parameters with an ID; and a bookmark information transmission unit which transmits the bookmark information to the image processing device including a combination of the location information and the ID as the parameter information in response to the parameters being received by the parameter reception unit. The image processing device further includes: a parameter input information reception unit which receives the parameter input information transmitted from the parameter input information transmission unit; an input process unit which allows the user to input the parameters using the parameter input information received by the parameter input information reception unit; a parameter transmission unit which transmits the parameters inputted through the input process unit to the parameter reception unit; and a bookmark information reception unit which receives the bookmark information transmitted from the bookmark information transmission unit. The bookmark information storage unit of the image processing device is configured to store the bookmark information received by the bookmark information reception unit. The service supply unit is configured to execute the service according to the parameters by reading out the parameters from the parameter storage unit based on the ID transmitted from the image processing device as the parameter information.

In the above image processing system, each of the parameter input information transmission unit, the parameter reception unit, the parameter storage unit and the bookmark information transmission unit can be implemented by a server on the network. In this case, the above units may either be implemented by a single server or multiple servers.

With the image processing system configured as above, when the parameter input information transmitted from the parameter input information transmission unit is received by the parameter input information reception unit of the image processing device, the input process unit allows the user to input the parameters using the received parameter input information. The inputted parameters are transmitted by the parameter transmission unit to the parameter reception unit, and the parameters received by the parameter reception unit are stored in the parameter storage unit being associated with an ID assigned to the parameters. The bookmark information transmission unit transmits to the image processing device the bookmark information including a combination of the location information and the ID as the parameter information. In the image processing device, the bookmark information reception unit receives the bookmark information transmitted from the bookmark information transmission unit and the bookmark information storage unit stores the received bookmark information. The service supply unit executes the service according to the parameters by reading out the parameters from the parameter storage unit based on the ID transmitted from the image processing device as the parameter information. By informing the service supply unit about the parameters by transmitting such an ID, the amount of information transmitted from the image processing device to the service supply unit can generally be reduced compared to cases where the parameters themselves are transmitted, and thus such a configuration is desirable for reducing the load on the network. Further, in cases where critical information is contained in the parameters, frequent transmission of such parameters (critical information) can cause problems from the viewpoint of security. Such problems can be eliminated or lessened by the method transmitting an ID only.

However, in order to employ such IDs, the service supply side has to be provided with the parameter storage unit for storing parameters and associating the parameters with IDs. When it is desirable to leave out such a parameter storage unit, the following configuration is also effective.

In another aspect, the network is provided with: a parameter input information transmission unit which transmits parameter input information to the image processing device to be used for allowing the user to input the parameters; a parameter reception unit which receives the parameters transmitted from the image processing device; and a location information transmission unit which transmits the location information to the image processing device in response to the parameters being received by the parameter reception unit. The image processing device further includes: a parameter input information reception unit which receives the parameter input information transmitted from the parameter input information transmission unit; an input process unit which allows the user to input the parameters using the parameter input information received by the parameter input information reception unit; a parameter transmission unit which transmits the parameters inputted through the input process unit to the parameter reception unit; and a location information reception unit which receives the location information transmitted from the location information transmission unit. The bookmark information storage unit of the image processing device is configured to store as the bookmark information a combination of the location information received by the location information reception unit and the parameters inputted through the input process unit. The service supply unit is configured to execute the service based on the parameters transmitted from the image processing device as the parameter information.

In the above image processing system, the service supply side does not store the parameters and the service receiving side transmits the parameters themselves to the service supply side each time a service is necessary. However, the load on the user is reduced also in this configuration since the user does not have to input the parameters each time (the parameters are extracted from the bookmark information). Further, since the service supply side is not required to have a unit for storing the parameters, this configuration, employing the bookmark information including the parameters themselves, is effective for systems that use a great number of IDs in the aforementioned method using IDs.

In another aspect, the image processing device further includes: a registration name storage unit configured to store a registration name assigned to each piece of bookmark information; and a registration name display unit configured to display the registration names stored in the registration name storage unit. The selection unit of the image processing device allows the user to select a piece of bookmark information from the bookmark information stored in the bookmark information storage unit by allowing the user to select one of the registration names displayed by the registration name display unit.

In the image processing device of the above image processing system, the registration names, each of which is assigned to each piece of bookmark information, are stored in the registration name storage unit, and the registration names stored in the registration name storage unit are displayed by the registration name display unit. The selection unit of the image processing device allows the user to select a piece of bookmark information from the bookmark information stored in the bookmark information storage unit by allowing the user to select one of the registration names displayed by the registration name display unit.

With the image processing system configured as above, the user can select a desired piece of bookmark information easily by referring to the registration names. The usability of the system can be enhanced further by assigning an easy-to-understand registration name to each piece of bookmark information.

The selection unit of the image processing device may also be configured to allow the user to select a piece of bookmark information stored in the bookmark information storage unit by allowing the user to operate a particular key of the image processing device.

With the image processing system configured as above, the user can select a desired piece of bookmark information only by operating a particular key, by which quick operation (e.g. selection by one-touch operation) can be realized.

In another aspect, the image processing device further includes at least one of: an export unit which reads out the bookmark information stored in the bookmark information storage unit and creates a file including the bookmark information; and an import unit which reads out the bookmark information from a file including the bookmark information and stores the bookmark information in the bookmark information storage unit.

While the image processing device is desired to be provided with both the import unit and the export unit, there is no problem even if the image processing device has only one of the import/export units since the transfer of the bookmark information becomes possible by combination with another device having the other of the import/export units.

The file created by the export unit or the file to be read by the import unit can be stored in a server or storage device on the network, a removable medium (e.g. memory card) that can be mounted on the image processing device, etc.

With the image processing system configured as above, the image processing device can write the bookmark information in a file or read out the bookmark information from a file, by which the bookmark information can be shared among image processing devices.

As a technique for sharing the bookmark information among image processing devices, the following configuration can be employed.

In another aspect, the image processing device further includes a bookmark information readout unit configured to read out the bookmark information from the bookmark information storage units of other image processing devices connected to the image processing device via the network.

Also in such an image processing system, the bookmark information can be shared among image processing devices since the image processing device can read out the bookmark information from other image processing devices.

As is clear from the above explanation, the following image processing device is desirable for forming the image processing system in accordance with the present invention.

In accordance with another aspect of the present invention, there is provided an image processing device comprising at least one of an image reading unit which reads an image and generates image data representing the image and an image printing unit which prints an image represented by image data, configured to form an image processing system in cooperation with a service supply unit provided on a network to be accessible from the image processing device using location information indicating a location on the network so as to execute a service regarding at least one of image data generated by the image reading unit and image data representing an image to be printed by the image printing unit in response to a request from the image processing device. The image processing device comprises: a bookmark information storage unit configured to store a combination of the location information and parameter information made of parameters set by a user or information convertible into the parameters by the service supply unit, as a piece of bookmark information; a selection unit which allows the user to select a piece of bookmark information from the bookmark information stored in the bookmark information storage unit; and a service requesting unit which requests the service supply unit to execute a service by accessing the service supply unit using the location information included in the bookmark information selected by the user while transmitting the parameter information included in the selected bookmark information to the service supply unit.

With the image processing device configured as above, the image processing system in accordance with the present invention can be formed in cooperation with other elements, by which effects described above can be achieved.

The following servers are desirable for forming the image processing systems in accordance with the present invention.

In accordance with another aspect of the present invention, there is provided a server forming the image processing system, comprising at least one of: the parameter storage unit which stores the parameters received by the parameter reception unit and associates the parameters with an ID assigned to the parameters; the bookmark information transmission unit which transmits to the image processing device the bookmark information including a combination of the location information and the ID as the parameter information in response to the parameters being received by the parameter reception unit; and the service supply unit which executes the service according to the parameters by reading out the parameters as the parameter information from the parameter storage unit based on the ID transmitted from the image processing device.

In accordance with another aspect of the present invention, there is provided a server forming the image processing system, comprising at least one of: the location information transmission unit which transmits the location information to the image processing device in response to the parameters being received by the parameter reception unit; and the service supply unit which executes the service according to the parameters, based on the parameters transmitted from the image processing device as the parameter information.

With the above servers, the image processing systems in accordance with the present invention can be formed in cooperation with other elements by which effects described above can be achieved.

In accordance with another aspect of the present invention, there is provided a server forming the image processing system, comprising at least one of: the parameter input information transmission unit which transmits parameter input information to the image processing device to be used for allowing the user to input the parameters; the parameter reception unit which receives the parameters transmitted from the image processing device; the parameter storage unit which stores the parameters received by the parameter reception unit and associates the parameters with an ID assigned to the parameters; and the bookmark information transmission unit which transmits the bookmark information to the image processing device including a combination of the location information and the ID as the parameter information in response to the parameters being are received by the parameter reception unit.

In accordance with another aspect of the present invention, there is provided a server forming the image processing system, comprising at least one of: the parameter input information transmission unit which transmits to the image processing device parameter input information to be used for allowing the user to input the parameters; the parameter reception unit which receives the parameters transmitted from the image processing device; and the location information transmission unit which transmits the location information to the image processing device in response to the parameters being received by the parameter reception unit.

Also with the above servers, the image processing systems in accordance with the present invention can be formed in cooperation with other elements, by which effects described above can be achieved.

Aspects of the invention may be implemented in computer software as programs storable on computer-readable media including but not limited to RAMs, ROMs, flash memory, EEPROMs, CD-media, DVD-media, temporary storage, hard disk drives, floppy disks, permanent storage, and the like.

Illustrative Embodiments

Referring now to the drawings, a description will be given in detail of an illustrative embodiment.

FIG. 1 is a block diagram showing the overall composition of an image processing system in accordance with an illustrative embodiment of the present invention. The image processing system of FIG. 1 includes an MFP (Multi Function Peripheral) 10, an MFP 20, a remote management device 30, a bookmark server 40, a directory server 50, a function server 60, etc. The MFP 10, the MFP 20, the remote management device 30 and the bookmark server 40 are connected to a LAN (Local Area Network) 70 to communicate data with one another via the LAN 70. The LAN 70 is connected to a WAN (Wide Area Network) 90 (e.g. the Internet) via a router 80. Therefore, the MFPs 10 and 20 are capable of communicating data with the directory server 50 and the function server 60 via the LAN 70, the router 80 and the WAN 90.

The MFP 10 is a multifunctional device having various functions such as a telephone (voice communication) function, a scanner function, a printer function, a copy function and a facsimile function. The MFP 10 includes a control unit 101, an operation unit 102, a scanner unit 103, a recording unit 104, a communication unit 106, a sound input unit 107, a sound output unit 108, a storage unit 110, etc.

The control unit 101 is mainly composed of a CPU (Central Processing Unit), ROM (Read Only Memory), RAM (Random Access Memory), etc. of well-known types. The ROM of the control unit 101 stores a program for allowing the CPU to execute various processes which will be explained later.

The operation unit 102 includes an operation panel having keys for receiving input operations from a user and a display for displaying information to the user. The operation panel is provided with function keys as relatively large keys pressed for using principal functions of the MFP 10 (in this illustrative embodiment, three function keys: a scan key corresponding to the scanner function, a print key corresponding to the printer function, and a copy key corresponding to the copy function), one-touch keys (20 in this illustrative embodiment) pressed for using previously registered functions (generally needing several key operations) with a simple operation (e.g. one-touch operation), directional keys pressed for designating the movement direction of a cursor (focus) in a display area of the display (in this illustrative embodiment, four directional keys corresponding to "Up", "Down", "Right" and "Left"), an OK key pressed for confirming an entry, a cancel key for canceling and discarding an entry, etc. As the display of the operation panel, an LCD (Liquid Crystal Display) capable of displaying several lines of character strings and simple symbols is employed.

The scanner unit 103 reads an image from a document which has been set on an ADF (Automatic Document Feeder) (not shown) or put on contact glass of a flat bed and thereby generates image data representing the image. The scanner unit 103 operates when an image is read by the scanner function, when an image to be transmitted is read by the facsimile function, etc.

The recording unit 104 records (prints) an image represented by image data on a sheet-like print medium such as paper. The recording unit 104 operates when an image is printed by the printer function, when a received image is printed by the facsimile function, when a copy image is printed by the copy function, etc.

The communication unit 106, implemented by an NIC (Network Interface Card) for example, executes processes for communicating data via the LAN 70. As components for communication, the MFP 10 is also provided with a modem for communicating data via telephone lines (not shown) and serial/parallel interfaces connectable with a personal computer, etc.

The sound input unit 107 includes a microphone installed in a handset of the MFP 10 and a unit for receiving sound (sound signal) from the microphone and generating sound data (e.g. PCM data) representing the sound.

The sound output unit 108 includes a speaker installed in the handset, a speaker installed in the body of the MFP 10, and a unit for converting sound data (e.g. PCM data) to a sound signal to be outputted by the speakers.

The storage unit 110, implemented by a readable and writable nonvolatile memory, stores a variety of information necessary for the operation of the MFP 10. The storage unit 110 may also be implemented by an HDD (Hard Disk Drive), etc. In the storage unit 110, a bookmark storage unit 120 is reserved as a storage area to be used during processes which will be explained later. In the bookmark storage unit 120, pieces of bookmark information 122 can be registered. The bookmark information 122 will be explained in detail later.

The MFP 20 is also a multifunctional device having the functions described in the above explanation of the MFP 10. Similarly to the MFP 10, the MFP 20 includes a control unit 201, an operation unit 202, a scanner unit 203, a recording unit 204, a communication unit 206, a sound input unit 207, a sound output unit 208, a storage unit 210, etc. Pieces of bookmark information 222 can be registered in a bookmark storage unit 220 reserved in the storage unit 210. The functions of the components of the MFP 20 are identical with those of the MFP 10 and thus repeated explanation thereof is omitted for brevity.

The remote management device 30 is a device used for setting the MFPs 10 and 20 via the LAN 70. The remote management device 30, implemented by a personal computer for example, includes a control unit 301, an operation unit 302, a communication unit 306, a storage unit 310, etc.

The control unit 301 is mainly composed of a CPU, ROM, RAM, etc. of well-known types. The ROM of the control unit 301 stores a BIOS (Basic Input Output System) and basic configuration data. An OS (Operating System) and other programs (various applications, etc.) stored in the storage unit 310 are read out and loaded on the RAM of the control unit 301. The CPU of the control unit 301 executes various processes according to the programs stored in the ROM and RAM, by which the components of the remote management device 30 are controlled.

The operation unit 302 includes a keyboard and pointing devices (e.g. mouse) for receiving input operations from a user and a display unit (e.g. LCD) for displaying information to the user.

The communication unit 306, implemented by an NIC for example, executes processes for communicating data via the LAN 70. As components for communication, the remote management device 30 is also provided with a modem for communicating data via telephone lines (not shown) and serial/parallel interfaces connectable with peripheral units like a printer, a storage device, etc.

The storage unit 310 is implemented by an auxiliary storage device such as an HDD. The storage unit 310 stores the OS, various application programs, various data files, and software used for setting the MFPs 10 and 20 via the LAN 70.

The bookmark server 40 is a computer capable of executing processes in response to requests from clients (the MFPs 10 and 20 in this illustrative embodiment) accessing the bookmark server 40 via the LAN 70. The bookmark server 40 includes a control unit 401, a communication unit 406, a storage unit 410, etc.

The control unit 401 is mainly composed of a CPU, ROM, RAM, etc. of well-known types. In the control unit 401, an OS and server software stored in the storage unit 410 are read out and loaded on the RAM. The CPU of the control unit 401 executes various processes according to the server software, by which the components of the bookmark server 40 are controlled and processes corresponding to the requests from the clients are executed.

The communication unit 406, implemented by an NIC for example, executes processes for communicating data via the LAN 70.

The storage unit 410 is implemented by an auxiliary storage device such as an HDD. The storage unit 410 stores the OS, the server software for realizing a server function, etc. In the storage unit 410, a bookmark storage unit 420 is reserved as a storage area to be used during processes which will be explained later. In the bookmark storage unit 420, pieces of bookmark information 422 can be registered. The bookmark information 422 will be explained in detail later.

The directory server 50, having a hardware configuration similar to that of the bookmark server 40, is a computer capable of executing processes in response to requests from the clients (the MFPs 10 and 20 in this illustrative embodiment) accessing the directory server 50 via the WAN 90. The directory server 50 includes a control unit 501, a communication unit 506, a storage unit 510, etc.

The control unit 501 is mainly composed of a CPU, ROM, RAM, etc. of well-known types. In the control unit 501, an OS and server software stored in the storage unit 510 are read out and loaded on the RAM. The CPU of the control unit 501 executes various processes according to the server software, by which the components of the directory server 50 are controlled and processes corresponding to the requests from the clients are executed.

The communication unit 506, implemented by an NIC for example, executes processes for communicating data via the WAN 90.

The storage unit 510 is implemented by an auxiliary storage device such as an HDD. The storage unit 510 stores the OS, the server software for realizing a server function, etc. In the storage unit 510, a service definition information storage unit 520 is reserved as a storage area to be used during processes which will be explained later. The service definition information storage unit 520 stores pieces of service definition information 522. The service definition information 522 will be explained in detail later.

The function server 60, having a hardware configuration similar to that of the bookmark server 40 and the directory server 50, is a computer capable of executing processes in response to requests from the clients (the MFPs 10 and 20 in this illustrative embodiment) accessing the function server 60 via the WAN 90. The function server 60 includes a control unit 601, a communication unit 606, a storage unit 610, etc.

The control unit 601 is mainly composed of a CPU, ROM, RAM, etc. of well-known types. In the control unit 601, an OS and server software stored in the storage unit 610 are read out and loaded on the RAM. The CPU of the control unit 601 executes various processes according to the server software, by which the components of the function server 60 are controlled and processes corresponding to the requests from the clients are executed. Incidentally, the control unit 601 of the function server 60, having far higher performance than the control units 101 and 201 of the MFPs 10 and 20, is capable of executing processes that are difficult for the MFPs 10 and 20.

The communication unit 606, implemented by an NIC for example, executes processes for communicating data via the WAN 90.

The storage unit 610 is implemented by an auxiliary storage device such as an HDD. The storage unit 610 stores the OS, the server software for realizing a server function, etc. In the storage unit 610, a service IF information storage unit 620 is reserved as a storage area to be used during processes which will be explained later. The service IF information storage unit 620 stores pieces of service IF information 622. The service IF information 622 will be explained in detail later.

In the storage unit 610, a service software storage unit 630, for storing pieces of service software 632, is also reserved. The service software 632 includes programs for allowing the function server 60 to execute types of services. Specifically, the function server 60 executes (supplies) various types of services by executing processes according to the service software 632 stored in the service software storage unit 630. The services executed by the function server 60 include a service regarding image data generated by the scanner unit 103 or 203 of the MFP 10 or 20, a service regarding sound data generated by the sound input unit 107 or 207 of the MFP 10 or 20, a service regarding image data representing an image to be printed by the recording unit 104 or 204 of the MFP 10 or 20, a service regarding sound data representing sound to be outputted by the sound output unit 108 or 208 of the MFP 10 or 20, etc.

In the storage unit 610, a user-designated parameter storage unit 640, for storing pieces of user-designated parameter information 642, is also reserved. The user-designated parameter information 642 will be explained in detail later.

The router 80 is a well-known device generally called a "broadband router", etc. In the default setting, ports of this type of router 80 are generally all closed regarding access from the WAN 90 to the LAN 70 so as to let the router 80 function as a firewall for preventing unauthorized access from the WAN 90 to the LAN 70. By this setting, after a request is transmitted from inside to outside (i.e. from the LAN 70 to the WAN 90), the router 80 only lets through packets as responses to the request, while blocking other packets transmitted from the WAN 90.

While the directory server 50 and the function server 60 are also connected to the WAN 90 generally via routers similar to the router 80, the presence/absence of such a router between the WAN 90 and the directory server 50 or function server 60 is not directly relevant to the principal part of the present invention and thus such routers are not shown in FIG. 1.

In the following, various types of data used in the image processing system and the usage of the data will be explained in detail. While the following explanation will be given taking the MFP 10 as an example (except when the explanation of the MFP 20 is particularly necessary), the following explanation applies also to the MFP 20 since the MFPs 10 and 20 are equivalent devices as mentioned above.

The service definition information 522 is the information stored in the storage unit 510 of the directory server 50. The service definition information 522 is used for supplying information on services executable by the function server 60 (types of the services and destinations of requests for the services) to the MFP 10. Specifically, the service definition information 522 is received by the MFP 10 and used for displaying a service selection screen indicating the types of services (see FIGS. 2A-2C) on the display of the operation unit 102, by which the user of the MFP 10 is prompted to select a service. The directory server 50 manages the services executable by the function server 60 while classifying them into three categories: "data storage service", "printing service" and "copy application service". On the service selection screen, the MFP 10 first displays the three categories to prompt the user to select one category, lets the user select one category, and thereafter displays services included in the selected category to prompt the user to select one service. The service definition information storage unit 520 stores a piece of service definition information 522 corresponding to a service selection screen for prompting the user to select a category (hereinafter referred to as "top service definition information 522") and pieces of service definition information 522 each of which corresponds to a service selection screen for prompting the user to select a service from each category.

FIGS. 3 and 4 are explanatory drawings showing examples of a data structure of the service definition information 522, in which FIG. 3 shows a data structure of the top service definition information 522 and FIG. 4 shows a data structure of service definition information 522 regarding the "copy application service" as one of the three categories. As shown in FIGS. 3 and 4, the service definition information 522 is described in XML (extended Markup Language). Definitions of tags used in FIGS. 3 and 4 are shown in FIG. 5.

Figure 2A:
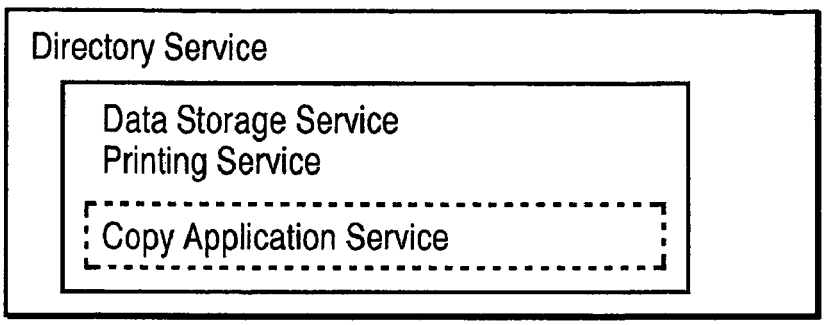
FIGS. 2A to 2C are schematic diagrams showing examples of service selection screens in accordance with aspects of the present invention.

When the top service definition information 522 (FIG. 3) is received by the MFP 10, a service selection screen shown in FIG. 2A is displayed on the display of the operation unit 102 of the MFP 10. Specifically, a character string "Directory Service" as a display title (Title) is displayed at the top of the screen, and character strings "Data Storage Service", "Printing Service" and "Copy Application Service" as items indicating selectable categories (Link_Title) are displayed under the display title. In this state, the user can move a cursor (a rectangle made of broken lines in FIGS. 2A-2C) up and down by pressing the "Up" key and "Down" key of the operation panel to select an item and thereafter confirm the selection of the item (selected with the cursor) by pressing the OK key of the operation panel. Each item on the service selection screen has been associated with an ID of service definition information 522 corresponding to each category (Link_Location). When a selection of an item is confirmed by the user, service definition information 522 having the ID associated with the selected item is received by the MFP 10.

Figure 2B:
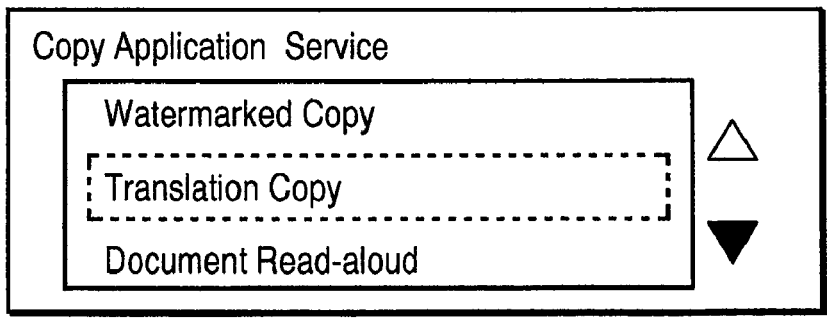

For example, when the item "Copy Application Service" is selected from the service selection screen of FIG. 2A, the service definition information 522 of FIG. 4 is received by the MFP 10, by which a service selection screen shown in FIG. 2B is displayed on the display. Specifically, a character string "Copy Application Service" as a display title (Title) is displayed at the top of the screen, and character strings "Watermarked Copy", "Translation Copy", "Document Read-aloud" and "Voice-text Conversion" as items indicating selectable services (Link_Title) are displayed under the display title.

Since the size of the display of the operation unit 102 for displaying the items is limited, when it is impossible to display all the items on the display, the MFP 10 displays upward/downward arrows (triangles) on the right of the displayed items (a black arrow when there is a hidden item in the direction of the arrow or a white arrow when there is no hidden item in the direction of the arrow), by which the user can grasp the presence/absence of hidden items. For example, on the service selection screen of FIG. 2B, the downward arrow colored black indicates that there is a hidden item under the item "Document Read-aloud". In this case, the user can scroll down (i.e. shift the displayed items upward) by moving the cursor downward by pressing the "Down" key of the operation panel of the operation unit 102, by which the hidden item "Voice-text Conversion" appears under the item "Document Read-aloud" as shown in FIG. 2C.

Figure 2C:
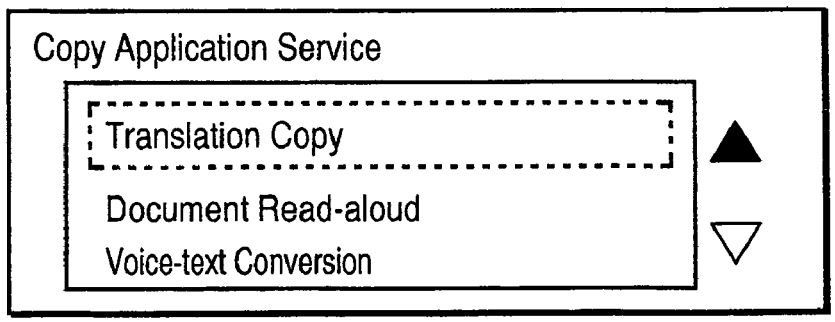

Also on the service selection screens of FIGS. 2B and 2C, the selection of an item is confirmed by the user by the operation explained above. On each service selection screen (FIG. 2B, FIG. 2C), each item has been associated with a URL (Uniform Resource Locator: information indicating a location on the WAN 90) for calling up each service (Link_Location). When a selection of an item is confirmed by the user, a service at the URL associated with the selected item is called up.

The service IF information 622 is the information stored in the service IF information storage unit 620 reserved in the storage unit 610 of the function server 60. The service IF information 622 is information for requesting the MFP 10 to send back parameters that have to be set for the execution of each service. Specifically, the service IF information 622 transmitted from the function server 60 is received by the MFP 10 and used for displaying a parameter input screen on the display of the operation unit 102 (examples are shown in FIGS. 6A-6E), by which the MFP 10 prompts the user to input the parameters. The service IF information storage unit 620 stores types of service IF information 622 corresponding to types of services executable by the function server 60.

Here, a concrete example of the service IF information 622 will be explained referring to FIGS. 7-9.

FIGS. 7-9 are explanatory drawings showing an example of a data structure of the service IF information 622. Specifically, FIGS. 7-9 show a data structure of service IF information 622 corresponding to a "translation copy service". The translation copy service is a service of executing an OCR (Optical Character Recognition) process to an image read by the scanner unit 103 of the MFP 10 to recognize a text (as the contents of the image), translating the text, generating image data of an image representing the translated text, and allowing the recording unit 104 of the MFP 10 to print the image data. As shown in FIGS. 7-9, the service IF information 622 is described in the same markup language (XML) as the aforementioned service definition information 522. Definitions of tags used in FIGS. 7-9 are shown in FIG. 10. Incidentally, the "Basic Data" in FIG. 10 is identical with that of the service definition information 522 shown in FIG. 5.

Figure 6A:
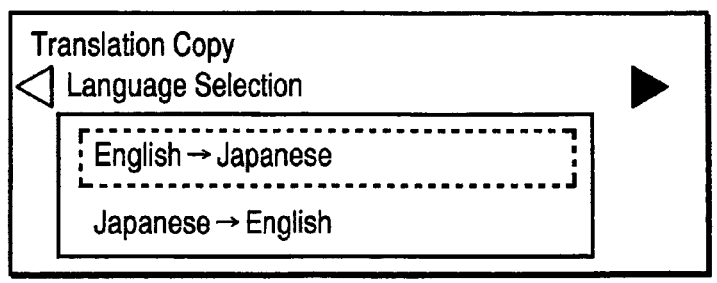
FIGS. 6A to 6E are schematic diagrams showing examples of parameter input screens in accordance with aspects of the present invention.

When the service IF information 622 (FIGS. 7-9) is received by the MFP 10, a parameter input screen shown in FIG. 6A is displayed on the display of the operation unit 102 of the MFP 10. Specifically, a character string "Translation Copy" as a display title (Title) is displayed at the top of the screen, a character string "Language Selection" as an entry item (Disp_Name) is displayed under the display title, and character strings "English→Japanese" and "Japanese→English" are displayed under the entry item as items indicating parameters selectable for the entry item "Language Selection" (Disp_Select). In this state, the user can move a cursor up and down by pressing the "Up" key and "Down" key of the operation panel of the operation unit 102 to select an item, similarly to the case of the aforementioned service selection screen.

In addition to the above entry item "Language Selection", the entry items (Disp_Name) for the display title "Translation Copy" include "Scanner Setting", "Print Setting" and "Comment" (see FIGS. 8 and 9).

Since the size of the display is limited, it is impossible to display all the entry items on the display. Therefore, the MFP 10 displays rightward/leftward arrows (triangles) on both sides of the displayed entry item (a black arrow when there is a hidden entry item in the direction of the arrow or a white arrow when there is no hidden entry item in the direction of the arrow), by which the user can grasp the presence/absence of hidden entry items. For example, on the parameter input screen of FIG. 6A, the rightward arrow colored black indicates that there is a hidden entry item to the right of the entry item "Language Selection". In this case, the user can scroll right by pressing the "Right" key of the operation panel of the operation unit 102, by which the parameter input screen of FIG. 6A is switched to a parameter input screen shown in FIG. 6B having the entry item "Scanner Setting".

Figure 6B:
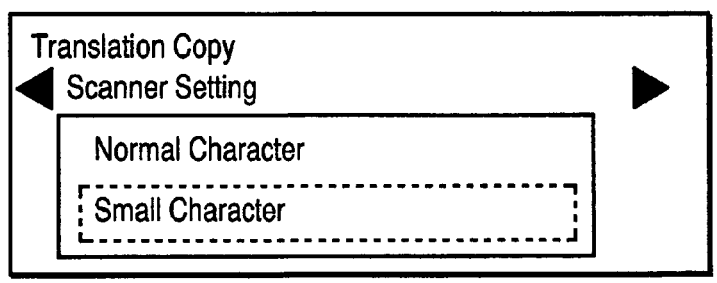

On the parameter input screen of FIG. 6B, a character string "Translation Copy" as a display title (Title) is displayed at the top of the screen, a character string "Scanner Setting" as an entry item (Disp_Name) is displayed under the display title, and character strings "Normal Character" and "Small Character" are displayed under the entry item as items indicating parameters selectable for the entry item "Scanner Setting" (Disp_Select).

Figure 11A:
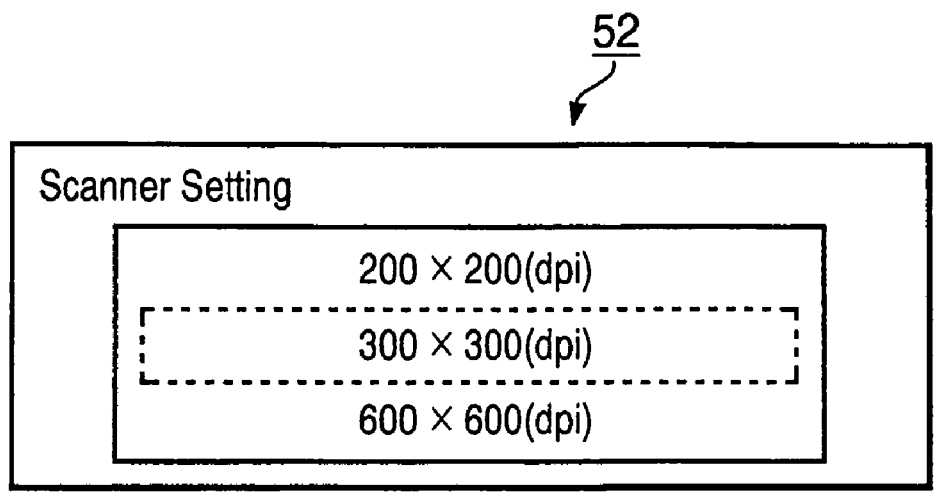
FIGS. 11A and 11B are schematic diagrams for explaining resolutions that can generally be set to an MFP of the image processing system in accordance with aspects of the present invention.

The item "Normal Character" means to set a resolution (reading resolution, as a parameter of the scanner unit 103) at 300×300 dpi, while "Small Character" means to set the resolution at 600×600 dpi. In this example, the resolution that can be set in the "Scanner Setting" is restricted to part of the resolutions that can be generally set to the MFP 10. Specifically, when the MFP 10 is used generally for reading (scanning) an image printed on paper, the resolution of the scanner unit 103 can be selected from three candidates (200×200 dpi, 300×300 dpi and 600×600 dpi) on a setting screen (see FIG. 11A) which is displayed on the display of the operation unit 102. Meanwhile, in the translation copy service, the setting of 200×200 dpi (low resolution parameter) is prohibited since the accuracy of the OCR process drops for low resolution images. In this example, the reading mode of the scanner unit 103 is also restricted to monochrome reading in order to increase the OCR accuracy.

Figure 6C:
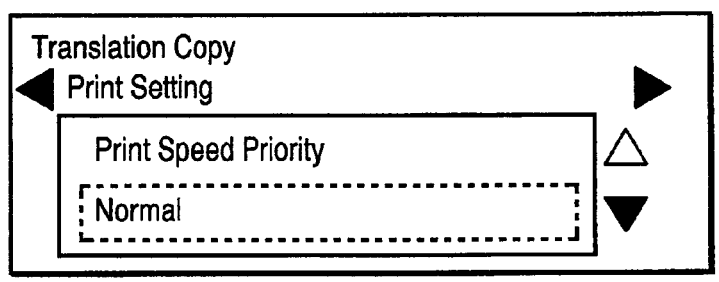

In the state shown in FIG. 6B, when the user presses the "Right" key of the operation panel of the operation unit 102, the parameter input screen of FIG. 6B is switched to a parameter input screen shown in FIG. 6C having the entry item "Print Setting".

On the parameter input screen of FIG. 6C, a character string "Translation Copy" as a display title (Title) is displayed at the top of the screen, a character string "Print Setting" as an entry item (Disp_Name) is displayed under the display title, and character strings "Print Speed Priority", "Normal" and "High-resolution" are displayed under the entry item as items indicating parameters selectable for the entry item "Print Setting" (Disp_Select).

Since the size of the display is limited, when it is impossible to display all the items on the display, the MFP 10 displays upward/downward arrows (triangles) on the right of the displayed items (a black arrow when there is a hidden item in the direction of the arrow or a white arrow when there is no hidden item in the direction of the arrow) similarly to the service selection screens of FIGS. 2B and 2C, by which the user can grasp the presence/absence of hidden items. The user seeing the parameter input screen of FIG. 6C can scroll down (i.e. shift the displayed items upward) by moving the cursor downward by pressing the "Down" key of the operation panel of the operation unit 102, by which the hidden item "High-resolution" appears under the item "Normal" as shown in FIG. 6D.

Figure 11B:
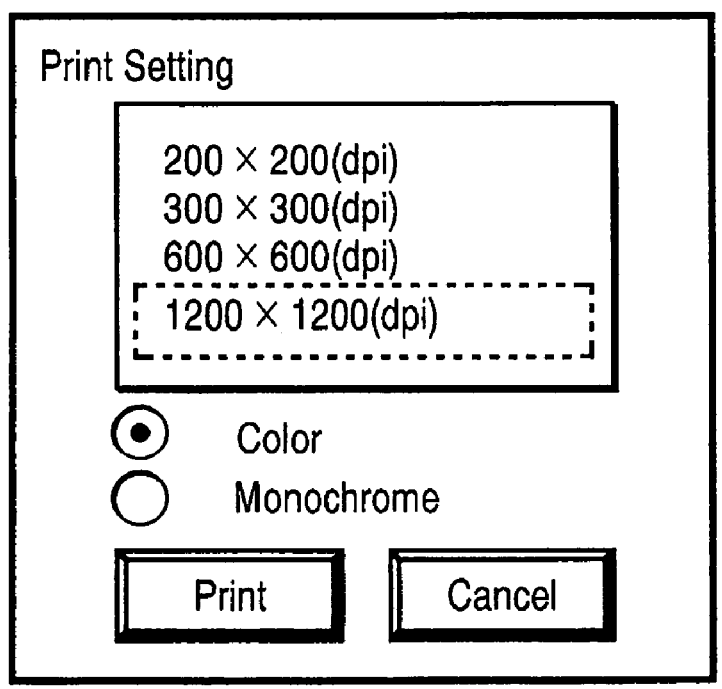

The item "Print Speed Priority" means to set a resolution (print resolution, as a parameter of the recording unit 104) at 200×200 dpi, the item "Normal" means to set the resolution at 300×300 dpi, and the item "High-resolution" means to set the resolution at 600×600 dpi. In this example, the resolution that can be set in the "Print Setting" is restricted to part of the resolutions that can be generally set to the MFP 10. Specifically, when a user of a personal computer (not shown) generally performs an operation for instructing the MFP 10 to print an image, the resolution of the recording unit 104 can be selected from four candidates (200×200 dpi, 300×300 dpi, 600×600 dpi and 1200×1200 dpi) on a setting screen (see FIG. 11B) which is displayed on a display unit of the personal computer. Meanwhile, in the translation copy service, the setting of 1200×1200 dpi (high resolution parameter) is prohibited since it is useless to set a print resolution higher than the highest resolution of the scanner unit 103. On the other hand, the setting of the low resolution parameter (200×200 dpi) is allowed in order to meet the needs of users hoping for high speed printing in spite of a drop in the print resolution. In this example, the print mode of the recording unit 104 is restricted to monochrome printing since the reading mode of the scanner unit 103 is restricted to monochrome reading.

Figure 6D:
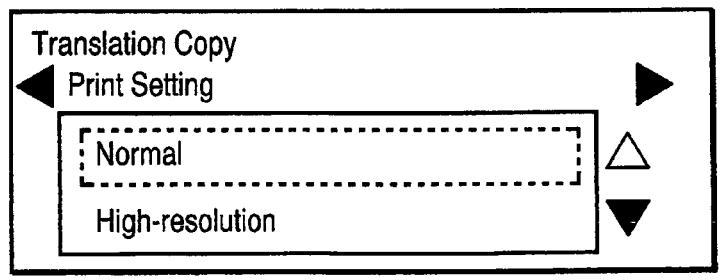
Figure 6E:
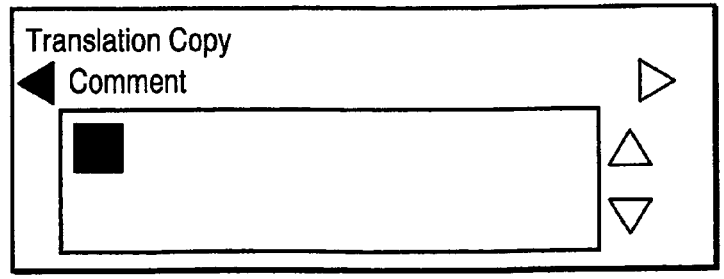

In the state shown in FIG. 6C or 6D, when the user presses the "Right" key of the operation panel of the operation unit 102, the parameter input screen of FIG. 6C or 6D is switched to a parameter input screen shown in FIG. 6E having the entry item "Comment".

On the parameter input screen of FIG. 6E, a character string "Translation Copy" as a display title (Title) is displayed at the top of the screen, a character string "Comment" as an entry item (Disp_Name) is displayed under the display title, and an input window used for entering a comment is displayed under the entry item. A black square in the input window is a cursor for character input. The comment entered in the input window will be used, for example, as a header/footer of the image printed by the recording unit 104.

As above, on the parameter input screens for the translation copy service (FIGS. 6A-6E), the user selects a parameter for each entry item ("Language Selection", "Scanner Setting", "Print Setting") and enters a comment. By pressing the OK key of the operation panel of the operation unit 102, the selection of the items designated with the cursors at this point (for each entry item not shown on the display, an item designated last) and the entry of the comment are confirmed (finalized). These parameters are transmitted to a URL (Action) of a program that receives and processes the input data.

Incidentally, the parameter input screens may also be configured to change parameters selectable for an entry item based on a parameter selected by the user for another entry item. For example, it is possible to prohibit the selection of the parameter "High-resolution" for the entry item "Print Setting" when the user has selected the parameter "Normal Character" for the entry item "Scanner Setting", by which a useless setting of the print resolution at 600×600 dpi when the reading resolution is 300×300 dpi can be prevented.

The bookmark information 122 is the information stored in the bookmark storage unit 120 reserved in the storage unit 110 of the MFP 10. The bookmark information 122 is information about services that have once been requested by the MFP 10 from the function server 60. Using the bookmark information 122, the same service (a service that has once been requested of the function server 60) can be requested of the function server 60 immediately, without the need of the service selection operation using the service definition information 522 or the inputting/setting of parameters using the service IF information 622.

While no concrete data structure of the bookmark information 122 is shown in FIG. 1, a piece of bookmark information 122 at least includes a "service execution unit URL" and a "user ID". Each piece of bookmark information 122 is stored in the bookmark storage unit 120 by being registered in one of three types of tables shown in FIGS. 12A-12C.

Specifically, in each piece of bookmark information 122, the "service execution unit URL" is a URL associated with a service that has once been requested by the MFP 10 from the function server 60, and the "user ID" is information that was reported by the function server 60 when the MFP 10 once requested the function server 60 to execute the service. The function server 60 is capable of converting the "user ID" received from the MFP 10 to parameters that were inputted by the user when the MFP 10 once requested the function server 60 to execute the service.

Specifically, the user-designated parameter storage unit 640 in a tabular form like the one shown in FIG. 13 is reserved in the storage unit 610 of the function server 60 so that pieces of user-designated parameter information 642 can be stored therein. When the MFP 10 makes a new request for the execution of a service, the function server 60 receives parameters necessary for the execution of the service from the MFP 10, generates a new user ID, stores the generated user ID and the parameters received from the MFP 10 in the user-designated parameter storage unit 640 as a piece of user-designated parameter information 642, and reports the generated user ID to the MFP 10. Thereafter, when a request for a service transmitted from the MFP 10 contains a user ID that the function server 60 has already reported to the MFP 10, the function server 60 can identify parameters intended by (the user of) the MFP 10 without the need of actually receiving the parameters from the MFP 10, by searching the user-designated parameter storage unit 640 using the already-reported user ID (included in the request from the MFP 10) as a key. By the above mechanism, the function server 60 can convert the "user ID" ("parameter information" in the present invention) received from the MFP 10 into the parameters that were once inputted by the user of the MFP 10 when the MFP 10 requested the function server 60 to execute the service.

As mentioned above, each piece of bookmark information 122 is registered in one of the three types of tables shown in FIGS. 12A-12C. The three types of tables correspond to different types of UIs (User Interfaces) of the MFP 10 for allowing the user to use the bookmark information 122. Specifically, the MFP 10 has three types of user interfaces UI#1, UI#2 and UI#3 for the use of the bookmark information 122. The UI#1 displays a list including pieces of bookmark information 122 on the display of the operation unit 102 and allows the user to select a piece of bookmark information 122 from the list by pressing the directional keys and OK key of the operation panel. The UI#2 previously allowed the user to assign a piece of bookmark information 122 to one of the one-touch keys of the operation panel and thereby allowed the user to select the bookmark information 122 by pressing the one-touch key. The UI#3 previously allowed the user to assign a piece of bookmark information 122 to one of the three function keys (the scan key, print key and copy key) and thereby allowed the user to select the bookmark information 122 by pressing the function key.

The table of FIG. 12A is for the use with the UI#1, in which a storage area for storing a "registration name" (given to each piece of bookmark information 122) is reserved in addition to storage areas for storing the service execution unit URL and the user ID. The MFP 10, displaying the list including pieces of bookmark information 122 on the display of the operation unit 102, presents the registration names in the list format and thereby allows the user to select a desired piece of bookmark information 122.

The table of FIG. 12B is for the use with the UI#2, in which the same number of entries (records) as the one-touch keys (20 entries in this illustrative embodiment, only three entries are shown in FIG. 12B) are reserved. The table of FIG. 12B is configured as a general-purpose storage area serving both as a storage area corresponding to the bookmark storage unit 120 and a storage area not corresponding to the bookmark storage unit 120. Specifically, each entry of the table of FIG. 12B includes a storage area for storing a "function type" in addition to storage areas for storing the service execution unit URL and the user ID. Among all the entries of the table of FIG. 12B, only those with the function type "iMFC" are used as the bookmark storage unit 120. While each entry of the table of FIG. 12B further includes storage areas for storing other types of information (e.g. FAX number) in addition to the storage areas for storing the function type, the service execution unit URL and the user ID, such storage areas are used only in entries without the function type "iMFC" (in entries not used as the bookmark storage unit 120). In such entries without the function type "iMFC", the storage areas for storing the service execution unit URL and the user ID are not used. In short, the table of FIG. 12B has redundant data structure that can be used both as the bookmark storage unit 120 and as a storage unit other than the bookmark storage unit 120, and whether each entry is used as the bookmark storage unit 120 is recorded in the "function type" of each entry. This type of redundant data structure (table configuration) is employed for the table of FIG. 12B since the one-touch keys of the operation panel of the operation unit 102 are not exclusively for the bookmark information 122 and functions unrelated to the bookmark information 122 can also be assigned to the one-touch keys.

The table of FIG. 12C is for the use with the UI#3, in which the same number of entries as the function keys (3 entries in this illustrative embodiment) are reserved. Each entry stores the service execution unit URL and the user ID. Incidentally, the function keys of the operation panel of the operation unit 102 are originally not exclusively for the bookmark information 122 and a particular function has been assigned to each function key in the default setting. Therefore, when an entry of the table of FIG. 12C corresponding to a function key pressed by the user has stored no service execution unit URL or user ID, the MFP 10 executes the process originally assigned to the function key. On the other hand, when the entry of the table of FIG. 12C corresponding to the function key pressed by the user has stored a service execution unit URL and a user ID, the MFP 10 executes a process which uses the bookmark information 122, instead of executing the process originally assigned to the function key.

While the bookmark information 122 stored in the bookmark storage unit 120 reserved in the storage unit 110 of the MFP 10 has been explained above, the bookmark information 222 stored in the bookmark storage unit 220 reserved in the storage unit 210 of the MFP 20 also has the same data structure and is used exactly in the same way as the bookmark information 122.

While the details will be explained below, the MFP 10 is capable of obtaining the bookmark information 222 of the MFP 20 and using the bookmark information 222 obtained from the MFP 20. Similarly, the MFP 20 is capable of obtaining the bookmark information 122 of the MFP 10 and using the bookmark information 122 obtained from the MFP 10.

The bookmark information 422 stored in the bookmark storage unit 420 reserved in the storage unit 410 of the bookmark server 40 includes files which are generated by "export functions" of the MFPs 10 and 20. Specifically, the MFP 10 has an "export function" of reading out the bookmark information 122 from the bookmark storage unit 120 reserved in the storage unit 110, creating a file including the bookmark information 122 and transmitting the file. The file is uploaded from the MFP 10 to the bookmark server 40 and stored in the bookmark server 40 as the bookmark information 422. The MFP 20 also has the same export function. A file including the bookmark information 222 stored in the bookmark storage unit 220 reserved in the storage unit 210 is created by the MFP 20, uploaded to the bookmark server 40, and stored in the bookmark server 40 as the bookmark information 422.

The bookmark information 422 stored in the bookmark server 40 as above can be used by the MFPs 10 and 20 through their "import functions". Specifically, the MFP 10, having an "import function" of reading out bookmark information recorded in a file and storing the bookmark information in the bookmark storage unit 120, can download the bookmark information 422 as a file from the bookmark server 40, read out the bookmark information 422 from the file, and store the bookmark information in the bookmark storage unit 120. The MFP 20, having the same import function, can also download the bookmark information 422 as a file from the bookmark server 40, read out the bookmark information 422 from the file, and store the bookmark information in the bookmark storage unit 220.

In the following, the outline of communication executed in the image processing system of this illustrative embodiment will be explained assuming a case where the MFP 10 is used by a user.

In the image processing system, the directory server 50 is configured to be able to supply the MFP 10 with information on services available to the MFP 10 via the network (the LAN 70 and the WAN 90), that is, information on services executable by the function server 60. The function server 60 is configured to be able to execute (supply) various types of services in response to requests from the MFP 10.

The image processing system employs HTTP (HyperText Transfer Protocol) 1.1 as a communication protocol for communicating data between the MFP 10 and the directory server 50 and between the MFP 10 and the function server 60. Each element (10, 50, 60) of the system sends an instruction to another element and receives a response to the instruction via messages included in an HTTP request and an HTTP response.

While the instructions communicated in the image processing system include two types of instructions: instructions from the MFP 10 to the directory server 50 or the function server 60 (server control instructions) and instructions from the directory server 50 or the function server 60 to the MFP 10 (MFP control instructions), the MFP 10 invariably (for both types of instructions) operates as a client of HTTP communication (i.e. the sender of HTTP requests), by which the MFP control instructions (instructions from the directory server 50 or the function server 60 to the MFP 10) are prevented from being blocked by the router 80 even when the router 80 is used in its default setting.

Specifically, the MFP 10 sends an instruction to the directory server 50 or function server 60 by attaching a message to the POST command in an HTTP request. Meanwhile, when the directory server 50 or function server 60 has an MFP control instruction in response to an MFP control instruction inquiry (an inquiry about an MFP control instruction) indicated by the message attached to the POST command in the HTTP request from the MFP 10, the directory server 50 or function server 60 transmits the MFP control instruction to the MFP 10 by including it in a message in an HTTP response as the response to the inquiry.

Figure 14:
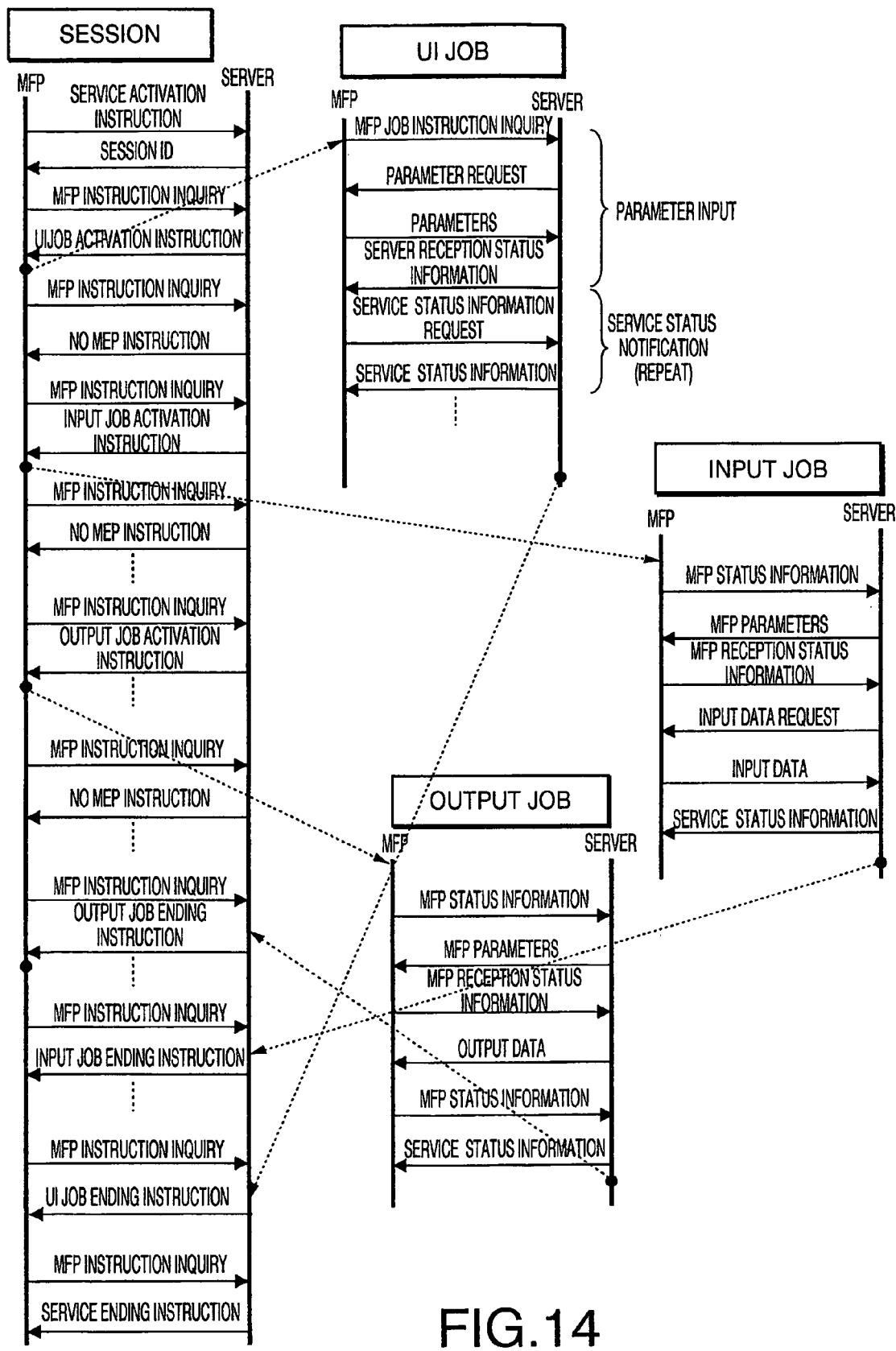
FIG. 14 is a sequence chart showing the flow of communication between the MFP and the function server in the image processing system in accordance with aspects of the present invention.

An example of communication executed between the MFP 10 and the function server 60 will be described referring to a sequence chart of FIG. 14.

The MFP 10 and the function server 60 execute a sequence of communication steps (hereinafter referred to as a "session") from the start of a service to the end of the service. At the start of a session, the MFP 10 transmits a service activation instruction (requesting activation of a service) to the function server 60. The function server 60 receiving the service activation instruction returns a session ID to the MFP 10. The session ID is an identifier used by the function server 60 for identifying each session. In subsequent communication, the MFP 10 attaches the session ID to each request and the function server 60 identifies the session based on the session ID, by which the function server 60 can deal with sessions concurrently.

After receiving the session ID, the MFP 10 periodically transmits MFP instruction inquiries (inquiring about instructions to the MFP 10) to the function server 60 and receives instructions from the function server 60 as responses to the MFP instruction inquiries. When there is no instruction as a response to the MFP instruction inquiry, the function server 60 returns a response indicating that there is no instruction (no MFP instruction).

In this example, the function server 60 first transmits a UI (User Interface) job activation instruction to the MFP 10. The UI job activation instruction informs the MFP 10 that the function server 60 starts using a UI device (operation unit 102) of the MFP 10, by which a UI job communication process is started between the MFP 10 and the function server 60. The UI job communication process is executed concurrently with the session. Along with the UI job activation instruction, a job ID for identifying the job (an identifier that is unique in the session) is transmitted from the function server 60 to the MFP 10. In the UI job communication process, the MFP 10 attaches the session ID and the job ID to each request and the function server 60 identifies the job based on the session ID and job ID, by which the function server 60 can deal with jobs concurrently. The details of the UI job communication process will be described later.

Subsequently, the function server 60 transmits an input job activation instruction to the MFP 10 at proper timing. The input job activation instruction informs the MFP 10 that the function server 60 starts using an input device (the scanner unit 103 or the sound input unit 107) of the MFP 10, by which an input job communication process is started between the MFP 10 and the function server 60. Similarly to the UI job communication process, the input job communication process is executed concurrently with the session. Along with the input job activation instruction, a job ID for identifying the job is transmitted from the function server 60 to the MFP 10. In the input job communication process, the MFP 10 attaches the session ID and the job ID to each request and the function server 60 identifies the job based on the session ID and job ID. The details of the input job communication process will be described later.

Subsequently, the function server 60 transmits an output job activation instruction to the MFP 10 at proper timing. The output job activation instruction informs the MFP 10 that the function server 60 starts using an output device (the recording unit 104 or the sound output unit 108) of the MFP 10, by which an output job communication process is started between the MFP 10 and the function server 60. Similarly to the UI job communication process and the input job communication process, the output job communication process is executed concurrently with the session. Along with the output job activation instruction, a job ID for identifying the job is transmitted from the function server 60 to the MFP 10. In the output job communication process, the MFP 10 attaches the session ID and the job ID to each request and the function server 60 identifies the job based on the session ID and job ID. The details of the output job communication process will be described later.

Subsequently, the function server 60 transmits an output job ending instruction (indicating the ending of the output job) to the MFP 10 at proper timing. Subsequently, the function server 60 transmits an input job ending instruction (indicating the ending of the input job) to the MFP 10 at proper timing.

Subsequently, the function server 60 transmits a UI job ending instruction (indicating the ending of the UI job) to the MFP 10 at proper timing. Subsequently, the function server 60 transmits a service ending instruction (indicating the ending of the service) to the MFP 10 at proper timing, by which the session is ended. The session is executed by the MFP 10 and the function server 60 as described above.

Next, the details of the UI job communication process will be described.

At the start of the UI job communication process, the MFP 10 transmits an MFP job instruction inquiry (inquiring about instructions to the MFP 10) to the function server 60. The function server 60 receiving the MFP job instruction inquiry returns a parameter request to the MFP 10. The parameter request is a request for allowing the user of the MFP 10 to set parameters necessary for the execution of the service. Along with the parameter request, the aforementioned service IF information 622 is transmitted from the function server 60 to the MFP 10.

The MFP 10 receiving the parameter request from the function server 60 displays the parameter input screen according to the service IF information 622 on the display of the operation unit 102 (see FIGS. 6A-6E, for example). After the parameters are set by the user, the MFP 10 transmits the parameters to the function server 60.

The function server 60 receiving the parameters from the MFP 10 returns server reception status information (indicating whether the function server 60 received the information from the MFP 10 normally) to the MFP 10.

After confirming that the parameters have been received by the function server 60 normally based on the server reception status information, the MFP 10 transmits a service status information request (requesting service status information indicating the status of the service) to the function server 60.

The function server 60 receiving the service status information request from the MFP 10 transmits service status information (indicating the status of the service and the function server 60) to the MFP 10.

Thereafter, the transmission of the service status information request by the MFP 10 and the transmission of the service status information by the function server 60 in response to the request are repeated.

Next, the details of the input job communication process will be described.

At the start of the input job communication process, the MFP 10 transmits MFP status information (indicating the status of the MFP 10) to the function server 60. The function server 60 receiving the MFP status information transmits MFP parameters to the MFP 10. The MFP parameters are the parameters of the input device that have been set by the user of the MFP 10 in the UI job communication process.

The MFP 10 receiving the MFP parameters from the function server 60 transmits MFP reception status information (indicating whether the MFP 10 received the information from the function server 60 normally) to the function server 60.

After confirming that the MFP parameters have been received by the MFP 10 normally based on the MFP reception status information, the function server 60 transmits an input data request (requesting input data corresponding to the job) to the MFP 10. The "input data corresponding to the job" means the image data generated by the scanner unit 103 when the job is a "scan job" (a job executed in a service regarding the image data generated by the scanner unit 103) or the sound data (e.g. PCM data) generated by the sound input unit 107 when the job is a "sound input job" (a job executed in a service regarding the sound data generated by the sound input unit 107).

The MFP 10 receiving the input data request from the function server 60 displays a screen for prompting the user to perform an input operation (image reading operation, sound input operation), generates input data, and transmits the input data generated by the input operation to the function server 60.

The function server 60 receiving the input data from the MFP 10 transmits service status information (indicating the status of the service and the function server 60) to the MFP 10.

Next, the details of the output job communication process will be described.

At the start of the output job communication process, the MFP 10 transmits MFP status information (indicating the status of the MFP 10) to the function server 60. The function server 60 receiving the MFP status information transmits MFP parameters to the MFP 10. The MFP parameters are the parameters of the output device that have been set by the user of the MFP 10 in the UI job communication process.

The MFP 10 receiving the MFP parameters from the function server 60 transmits MFP reception status information (indicating whether the MFP 10 received the information from the function server 60 normally) to the function server 60.

After confirming that the MFP parameters have been received by the MFP 10 normally based on the MFP reception status information, the function server 60 transmits output data to the MFP 10. The "output data" means image data when the job is a "print job" (a job executed in a service regarding image data representing an image to be printed by the recording unit 104) or sound data (e.g. PCM data) when the job is a "sound output job" (a job executed in a service regarding sound data representing sound to be outputted by the sound output unit 108).

The MFP 10 receiving the output data from the function server 60 executes an output process (the printing of the image, the outputting of the sound) according to the output data. Thereafter, the MFP 10 transmits MFP status information (indicating the status of the MFP 10) to the function server 60.

The function server 60 receiving the MFP status information from the MFP 10 transmits service status information (indicating the status of the service and the function server 60) to the MFP 10.

The outline of the communication executed in the image processing system of this illustrative embodiment is as described above.

In the following, how the bookmark information is generated, stored and thereafter used in the image processing system (principal part of the present invention) will be explained in detail referring to a sequence chart of FIG. 15.

While the MFP 10 and the function server 60 executing a session (a sequence of communication steps) for the execution of a service actually activate the UI job, input job, output job, etc. in parallel and requests (necessarily) from the MFP 10 and responses from the function server 60 in response to the requests are repeated alternately as explained above, such a communication procedure itself is not necessarily important for understanding how the bookmark information is generated, stored and thereafter used in the image processing system. Therefore, in order to avoid the complication of the explanation, the UI job, input job, output job, etc. are not explicitly distinguished (when the distinction is not particularly necessary) in a sequence of communication steps for the execution of the service in the sequence chart of FIG. 15, and the communication between the MFP 10 and the function server 60 will be explained simply along a time series. Among the alternate repetition of requests from the MFP 10 and responses from the function server 60 in response to the requests, some requests actually transmitted from the MFP 10 will not be shown in FIG. 15 when only responses (substantial transmission of information) from the function server 60 to the MFP 10 are important.

Figure 15:
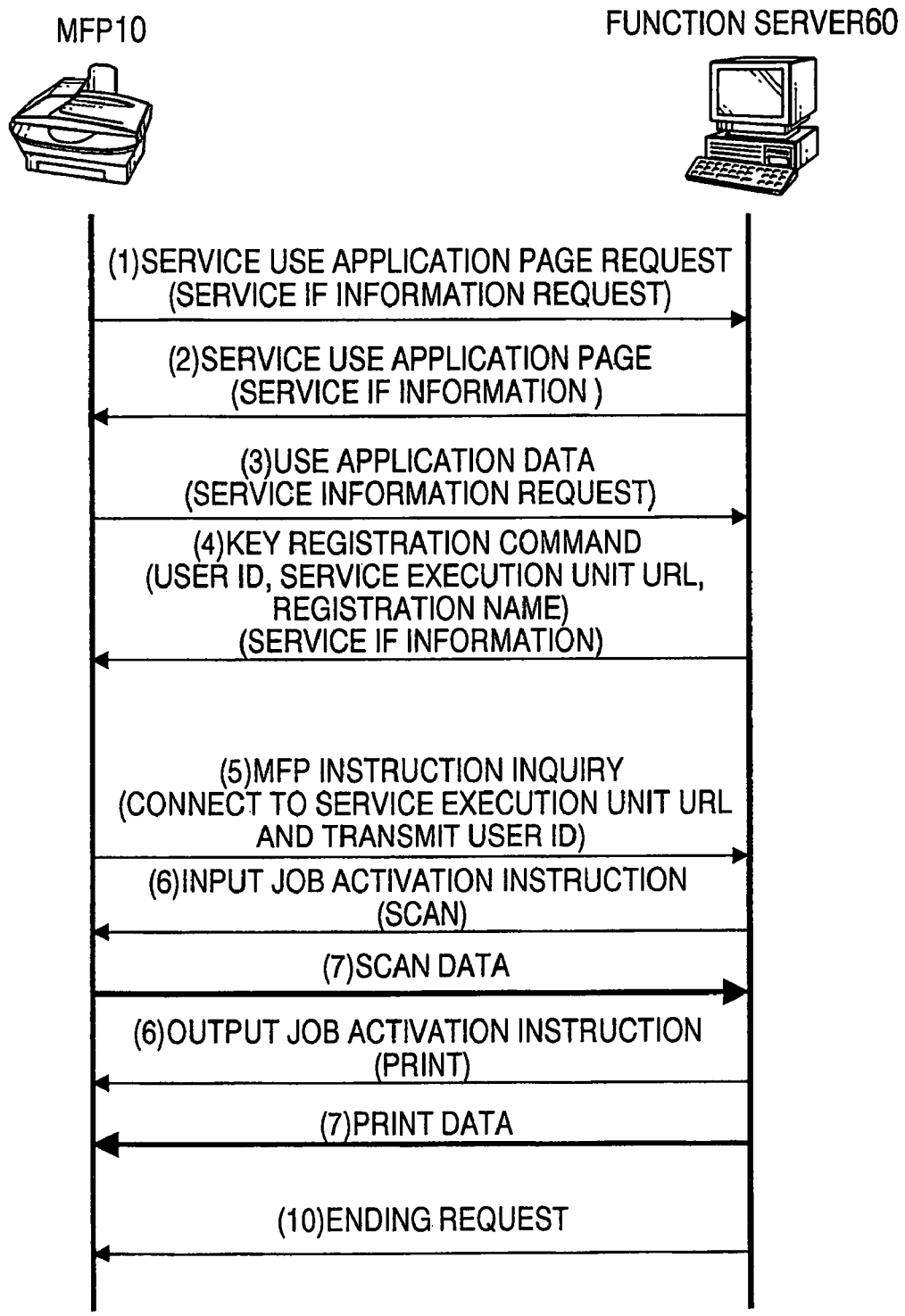
FIG. 15 is a sequence chart showing the flow of communication between the MFP and the function server in regard to bookmark information in accordance with aspects of the present invention.

The communication shown in the sequence chart of FIG. 15 is executed according to the following procedure.

First, when the user of the MFP 10 selects a desired service by operating the operation unit 102, the MFP 10 requests the function server 60 to send back service IF information 622 corresponding to a service use application page. Incidentally, a URL as the destination of the request has been described in the aforementioned service definition information 522 stored in the directory server 50.

The function server 60 receiving the request from the MFP 10 reads out the service IF information 622 corresponding to the requested service use application page from the service IF information storage unit 620 reserved in the storage unit 610 and transmits the service IF information 622 (service use application page) to the MFP 10. The service use application page ("parameter input information" in the present invention) will be used by the MFP 10 for allowing the user to input parameters.

Figure 16A:
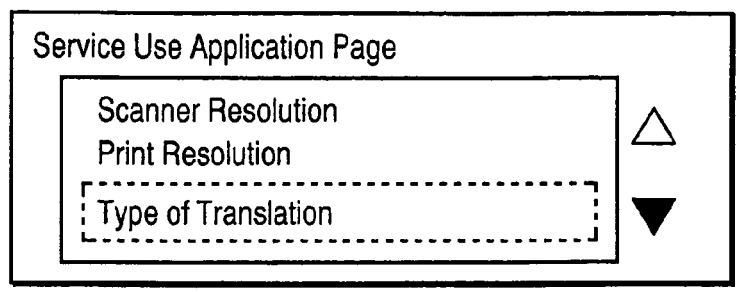
FIGS. 16A to 16E are schematic diagrams showing parameter input screens displayed in an English document translation service in accordance with aspects of the present invention.
Figure 16B:
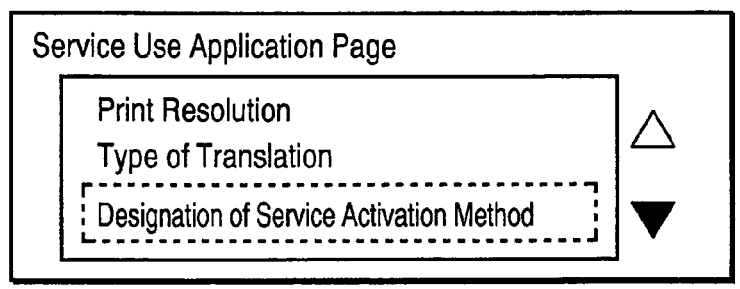

Specifically, in the case of an "English Document Translation Service" (in which an English document read by the scanner unit 103 of the MFP 10 is sent to the function server 60 to be translated into another language and the translated document is returned to the MFP 10 and printed by the recording unit 104 of the MFP 10) for example, the MFP 10 displays information shown in FIGS. 16A-16E and 17A-17D on the display of the operation unit 102 based on the service IF information 622 transmitted from the function server 60. While the operating method for entering and setting parameters for these items is in conformity with the method explained in the above chapter "<Service IF Information>", in this "English Document Translation Service", the user can make settings, according to the user's wishes, regarding four items: "Scanner Resolution", "Print Resolution", "Type of Translation" and "Service Activation Method" as shown in FIGS. 16A and 16B.

Figure 16C:
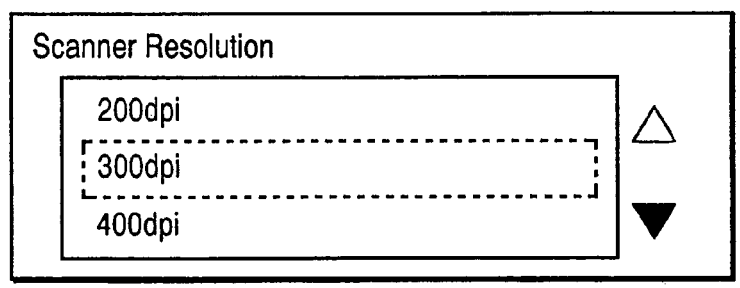
Figure 16D:
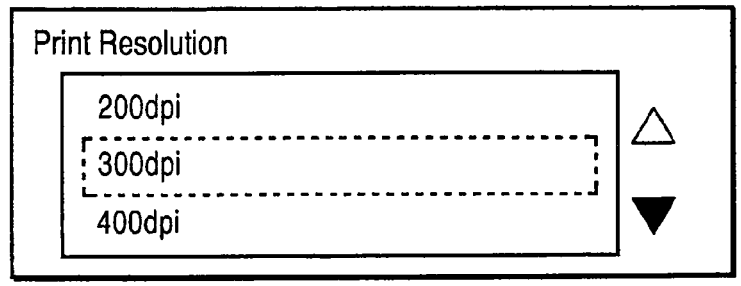
Figure 16E:
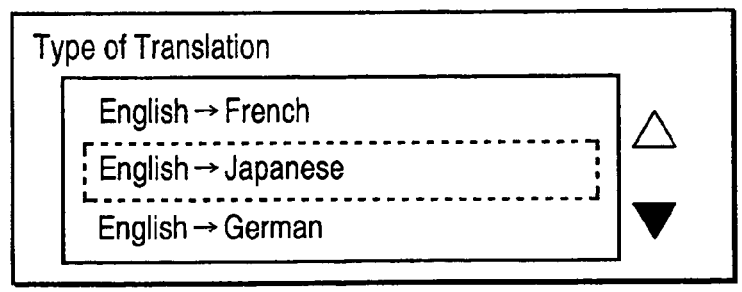

The scanner resolution can be selected from 200 dpi, 300 dpi, 400 dpi, etc. as shown in FIG. 16C. The print resolution can also be selected from 200 dpi, 300 dpi, 400 dpi, etc. as shown in FIG. 16D. The type of translation can be selected from "English→French", "English→Japanese", "English→German", etc. as shown in FIG. 16E.

Figure 17A:
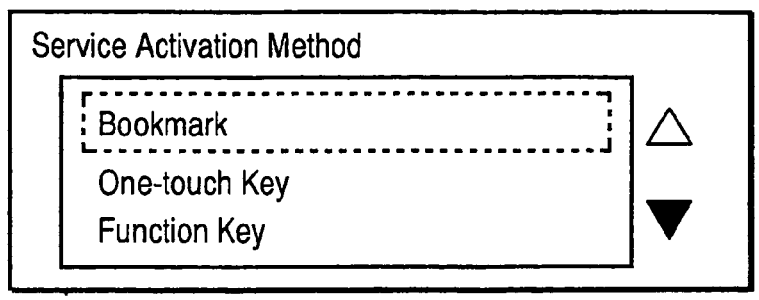
FIGS. 17A to 17D are schematic diagrams showing screens used for setting the registration of the bookmark information in accordance with aspects of the present invention.
Figure 17B:
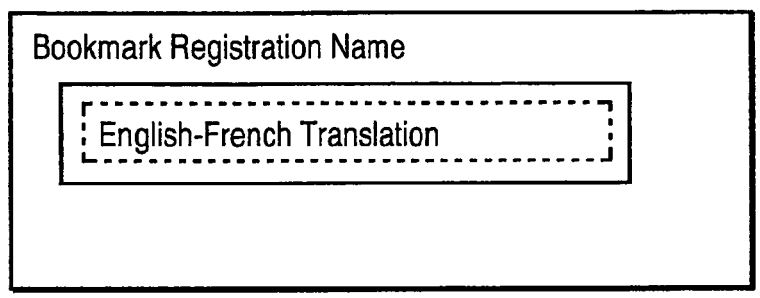
Figure 17C:
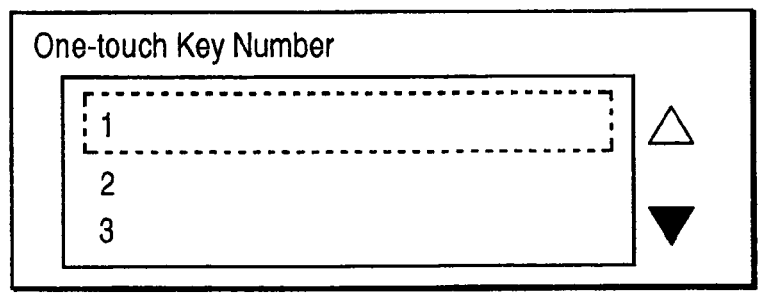
Figure 17D:
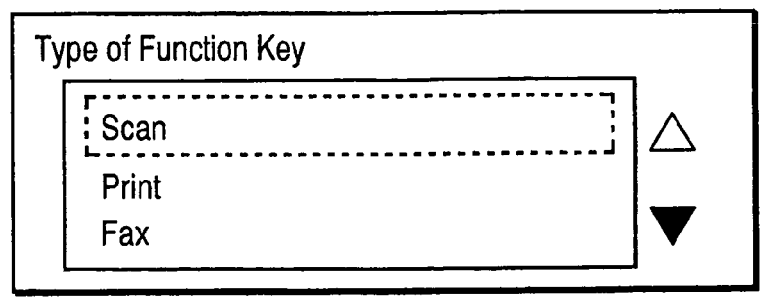

The "Service Activation Method" is a setting item relevant to the present invention. The service activation method can be selected from "Bookmark", "One-touch Key" and "Function Key" as shown in FIG. 17A. The selection of the service activation method from the three methods corresponds to the selection of a UI from the three types of UIs (UI#1, UI#2 and UI#3) explained in the chapter "<Bookmark Information of MFP and User-designated Parameter Information of Function Server>". When "Bookmark" is selected by the user, an input window for "Bookmark Registration Name" is displayed as shown in FIG. 17B. While an initial value ("English-French Translation 1" in FIG. 17B) described in the service IF information 622 is entered in the input window as the default, the initial value can be changed by the user to a different description. When "One-touch Key" is selected by the user, a screen for selecting a "One-touch Key Number" is displayed as shown in FIG. 17C. When "Function Key" is selected by the user, a screen for selecting a type of function key is displayed as shown in FIG. 17D.

The user of the MFP 10 viewing the above screens inputs the parameters necessary for the execution of the service (FIGS. 16C-16E) and makes the setting of the UI for subsequent use of the bookmark information (FIGS. 17A-17D) by operating the operation unit 102. Thereafter, the user presses the OK key, by which the inputted information is transmitted by the MFP 10 to the function server 60 as use application data.

The function server 60 receiving the use application data from the MFP 10 generates a user ID corresponding to the received data and stores the generated user ID and the received use application data (parameters) in the user-designated parameter storage unit 640 as a piece of user-designated parameter information 642. Subsequently, the function server 60 transmits information including the generated user ID, a URL (service execution unit URL) for activating the service (necessary for the MFP 10 to use the function server 60), a bookmark registration name entered in the input window of FIG. 17B (if any), etc. to the MFP 10 as a key registration command.

The MFP 10 receiving the key registration command registers the (pieces of) information included in the received key registration command in one of the three types of tables shown in FIG. 12A-12C (corresponding to the UI selected from the three types of UIs (UI#1-UI#3)) as the bookmark information 122.

By the above communication between the MFP 10 and the function server 60, the parameters inputted to the MFP 10 are sent to the function server 60 and the function server 60 is enabled to execute the service requested by the MFP 10. The parameters sent to the function server 60 are stored in the function server 60 together with the user ID assigned thereto, while the user ID, the service execution unit URL, etc. are reported to the MFP 10 as the key registration command. In the MFP 10, the user ID, the service execution unit URL, etc. are extracted from the key registration command and stored as the bookmark information 122.

The bookmark information 122 stored in the MFP 10 by the above procedure is used according to the following procedure.

First, the user of the MFP 10 selects a piece of already-registered bookmark information 122 using the UI selected from the three types of UIs (UI#1-UI#3). When a piece of bookmark information 122 is selected by the user, the MFP 10 refers to information included in the selected bookmark information 122 and transmits the user ID (included in the bookmark information 122) to the service execution unit URL (included in the bookmark information 122).

The function server 60 receives the user ID transmitted from the MFP 10 to the service execution unit URL and searches the user-designated parameter storage unit 640 using the user ID as a key. If a piece of user-designated parameter information 642 (including parameters) having the same user ID is found in the user-designated parameter storage unit 640, it means that the parameters included in the user-designated parameter information 642 are intended by the MFP 10, and thus the function server 60 executes the service (e.g. the English document translation service) using the parameters.

Specifically, in the case of the English document translation service, the function server 60 first transmits a scan request to the MFP 10. The MFP 10 receiving the scan request transmits scan data to the function server 60. The function server 60 receives the scan data and executes the service by activating software corresponding to the English document translation service (software for converting the scan data into English text data and software for translating the English text data into text data in a different language) out of the service software 632 stored in the service software storage unit 630. Subsequently, the function server 60 transmits a print request to the MFP 10, transmits print data to the MFP 10, and finally transmits an ending request to the MFP 10, by which the session (a sequence of communication steps) is finished. Incidentally, while the print request, the print data and the ending request are actually transmitted by the function server 60 as responses to requests from the MFP 10, the requests are not shown in the sequence chart of FIG. 15 as mentioned above. While scan data is transmitted from the MFP 10 to the function server 60 and print data is transmitted from the function server 60 to the MFP 10 in this example (English document translation service), the types of data communicated between the MFP 10 and the function server 60 vary depending on the type of service and various types of data (sound data, image data, text data, etc.) can be communicated between the MFP 10 and the function server 60.

Using the bookmark information 122 stored in the MFP 10 according to the above procedure, when bookmark information 122 regarding a service has already been stored in the bookmark storage unit 120, the user of the MFP 10 can receive the service only by selecting a piece of bookmark information 122, without the need of inputting necessary parameters upon each execution of the service.

Incidentally, in the session (from the registration of the bookmark information to the use of the bookmark information) which has been explained above referring to the sequence chart of FIG. 15, the first half (till the registration of the bookmark information) may either be executed exclusively as a "service registration application from the MFP 10 to the function server 60" or as both the "service registration application from the MFP 10 to the function server 60" and a "first service execution request". Specifically, while the user ID is eventually transmitted from the MFP 10 to the function server 60 in the former case, the parameters necessary for the execution of the service have already been sent from the MFP 10 to the function server 60 at the point when the "service registration application from the MFP 10 to the function server 60" is made, and thus the function server 60 at this point is in an exceptional state in which it can immediately execute the service without the need of receiving the user ID. Therefore, it is possible to handle the "service registration application from the MFP 10 to the function server 60" as both the "service registration application from the MFP 10 to the function server 60" and the "first service execution request" and let the function server 60 immediately execute the service without receiving the user ID.

The remote management device 30 is a device used for setting the MFPs 10 and 20 via the LAN 70. The remote management device 30 has a "remote bookmark setting function" as a function relevant to the present invention. The remote bookmark setting function is provided as one of the functions of a remote management tool operating on the remote management device 30, by which a remote bookmark setting screen like the one shown in FIG. 18 is displayed on a display unit of the operation unit 302 of the remote management device 30 when a user of the remote management device 30 performs a prescribed operation on the operation unit 302.

In this illustrative embodiment, the remote management device 30 is implemented by a personal computer employing the "Windows" (registered trademark) as its OS (Operating System), and the remote management tool has a window-type GUI (Graphic User Interface) similarly to a variety of well-known software operating under the control of the OS. The remote bookmark setting screen shown in FIG. 18 is one of the windows (dialogs) displayed by the remote management tool.

Figure 18:
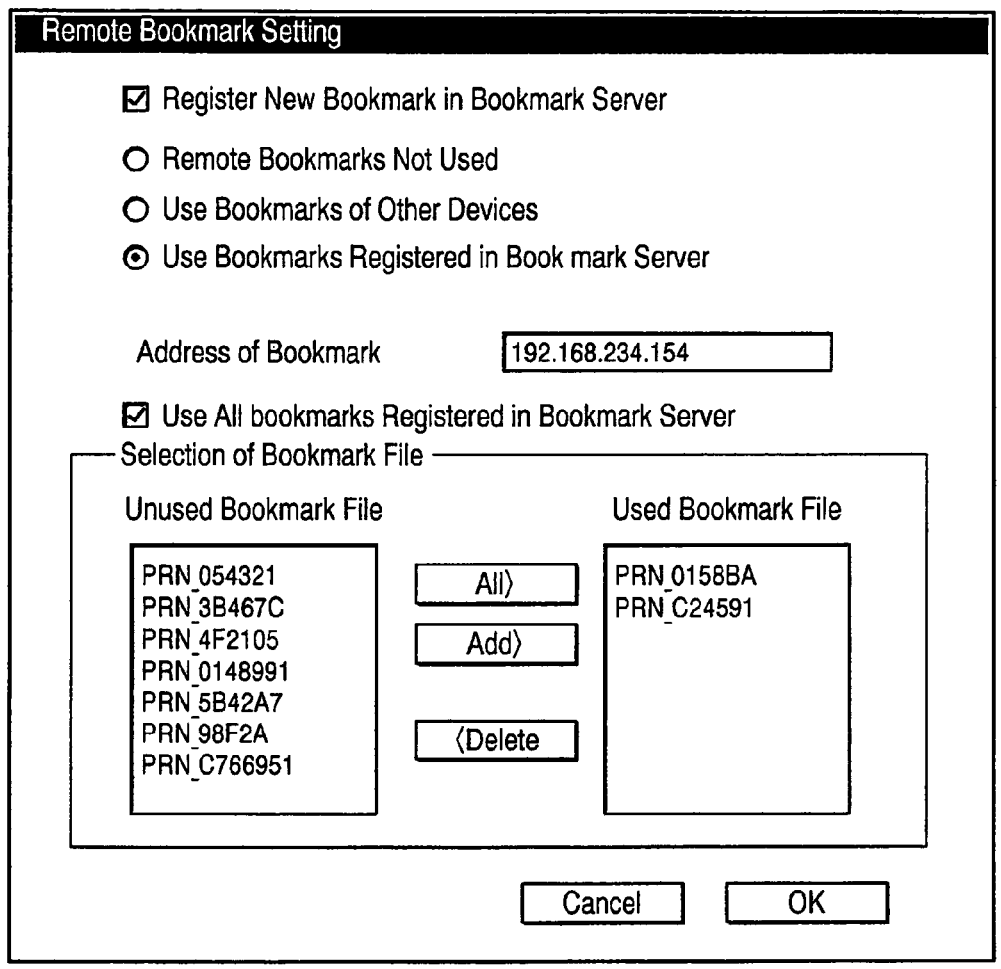
FIG. 18 is a screen image showing a remote bookmark setting screen displayed by a remote management device of the image processing system in accordance with aspects of the present invention.

The remote bookmark setting screen of FIG. 18 is provided with items having check boxes, radio buttons, input windows, etc. which are commonly used in window-type GUIs of this type. Specifically, the remote bookmark setting screen includes the following setting items.

The item "Register New Bookmark in Bookmark Server" (item 1) is used for setting (designating) whether each piece of bookmark information 122 newly stored (additionally registered) in the bookmark storage unit 120 of the MFP 10 as explained above should be further registered in the bookmark server 40.

The item "Remote Bookmarks Not Used" (item 2) is selected when bookmark information of other devices (for the MFP 10, the bookmark information 222 and 422 of the MFP 20 and the bookmark server 40) is not used. The item "Use Bookmarks of Other Devices" (item 3) is selected when bookmark information of other equivalent devices (for the MFP 10, the bookmark information 222 of the MFP 20) is used. The item "Use Bookmarks Registered in Bookmark Server" (item 4) is selected when bookmark information 422 of the bookmark server 40 is used. The three items 2-4 are provided on the remote bookmark setting screen as radio buttons each to be selected exclusively (only one at a time).

Items 5-7 explained below become effective only when the item 4 has been selected. The item "Address of Bookmark Server" (item 5) is used for entering an IP address assigned to the bookmark server 40 on the LAN 70. The item "Use All Bookmarks Registered in Bookmark Server" (item 6) is used for setting (designating) whether all pieces of bookmark information 422 managed by the bookmark server 40 as files should be used. The item "Selection of Bookmark Files" (item 7) is used for selecting (adding/deleting) bookmark information files necessary for the user from all pieces of bookmark information 422 managed by the bookmark server 40 as files, in which the left-hand box shows unnecessary files and the right-hand box shows necessary files. The user can select necessary bookmark information files by placing desired files in the right-hand box by designating each file in a box and pressing the "Add→" button, the "←Delete" button or the "All→" button placed between the two boxes.

When the user who has finished setting values to the items 1-7 performs an operation for pressing the OK button on the screen (clicking of the OK button with a pointing device like a mouse, pressing a shortcut key to which an equivalent function has been assigned, etc.), the settings made on the remote bookmark setting screen of FIG. 18 are transmitted from the remote management device 30 to the MFP 10 or 20 and stored in the storage unit 110/210 of the MFP 10/20.

Specifically, the MFPs 10 and 20 and the remote management device 30 in this illustrative embodiment operate as devices supporting SNMP (Simple Network Management Protocol). The MFPs 10 and 20 are provided with functions as SNMP agents while the remote management device 30 is provided with functions as an SNMP manager. Set values regarding the MFP 10 or 20 (SNMP agent) are transmitted from the remote management device 30 (SNMP manager) according to SNMP while designating an OID (Object ID), and stored in an MIB (Management Information Base) which is employed in SNMP.

After the settings regarding the bookmark information have been made to the MFPs 10 and 20, processes related to the bookmark information are executed by the MFPs 10 and 20, in which the MFPs 10 and 20 operate as follows.

Figure 19A:
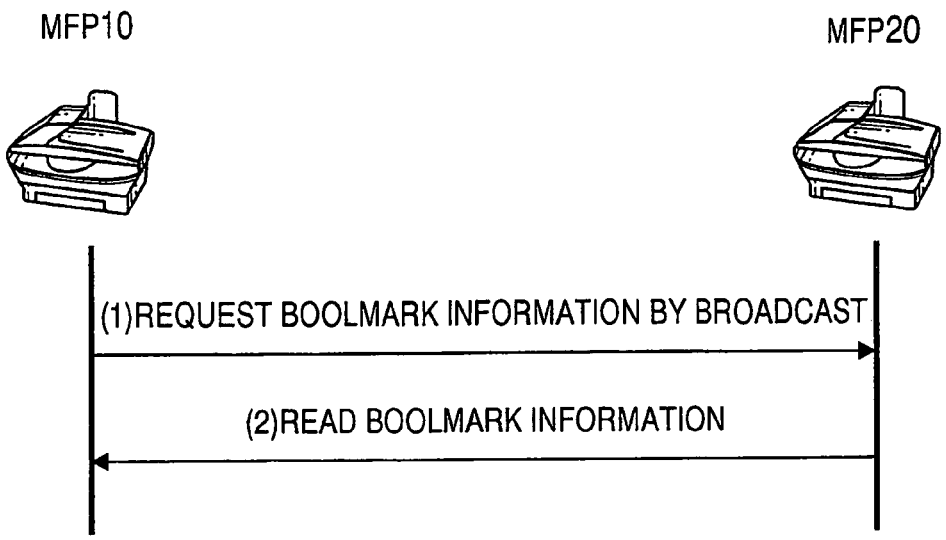
FIGS. 19A and 19B are sequence charts showing cases where the MFP uses bookmark information of other devices in accordance with aspects of the present invention.

FIG. 19A is a sequence chart showing a case where the aforementioned item "Use Bookmarks of Other Devices" (item 3) has been selected regarding the settings of the MFP 10. In this case, when the aforementioned UI#1 is used, the MFP 10 (before displaying the list of bookmark information on the display of the operation unit 102) requests other devices having equivalent functions to send back their bookmark information by broadcasting the request. In this illustrative embodiment, the MFP 20 corresponds to the "device having equivalent functions". In response to the request from the MFP 10, the MFP 20 transmits its bookmark information 222 as the response to the broadcast request. The MFP 10 receives the bookmark information 222 from the MFP 20 and displays a list including both its own bookmark information 122 and the bookmark information 222 of the MFP 20 on the display of the operation unit 102, by which the user of the MFP 10 is allowed to use not only the bookmark information 122 of the MFP 10 but also the bookmark information 222 of the MFP 20.

Figure 19B:
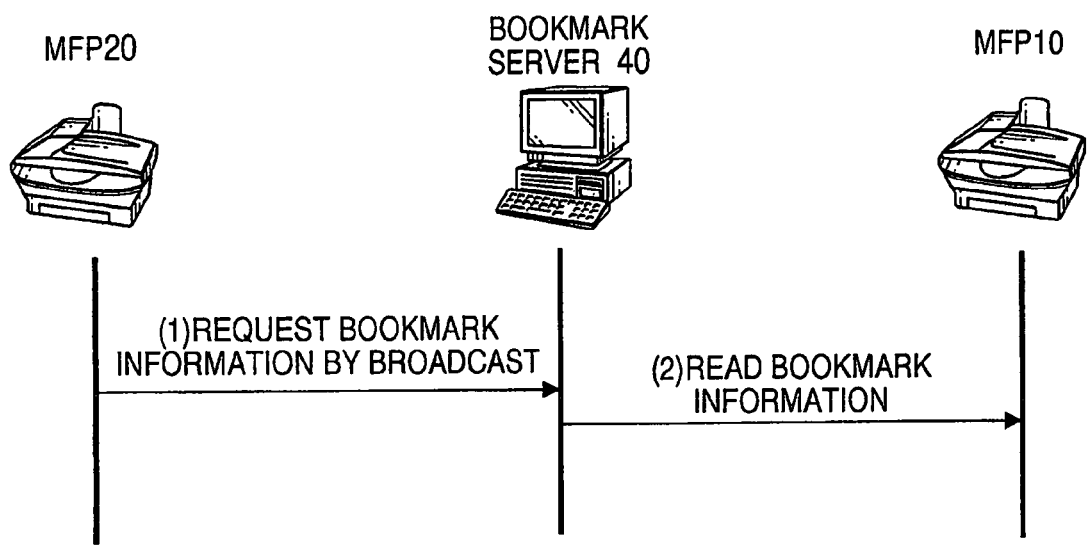

FIG. 19B is a sequence chart showing a case where the item "Register New Bookmark in Bookmark Server" (item 1) has been selected regarding the settings of the MFP 20 and the item "Use Bookmarks Registered in Bookmark Server" (item 4) has been selected regarding the settings of the MFP 10. In this case, the MFP 20 newly storing (additionally registering) a piece of bookmark information 222 in the bookmark storage unit 220 further registers the new piece of bookmark information 222 in the bookmark server 40. Specifically, the MFP 20 creates a file including the bookmark information 222 and uploads the file to the bookmark server 40 by its export function, and the bookmark server 40 stores the file as the bookmark information 422. Consequently, devices capable of using the bookmark server 40 (e.g. the MFP 10) can thereafter utilize bookmark information equivalent to that managed in the MFP 20, by using the bookmark information 422 of the bookmark server 40. Specifically, when the aforementioned UI#1 is used, the MFP 10 (before displaying the list of bookmark information on the display of the operation unit 102) reads out the bookmark information 422 from the bookmark storage unit 420 (existing in the bookmark server 40 as files) by its import function, and displays a list including both its own bookmark information 122 and the bookmark information 422 of the bookmark server 40 on the display of the operation unit 102, by which the user of the MFP 10 is allowed to use not only the bookmark information 122 of the MFP 10 but also the bookmark information 422 of the bookmark server 40.

The settings regarding the bookmark information of the MFPs 10 and 20 and the operation of the MFPs 10 and 20 according to the settings are as explained above.

In the following, processes executed by the MFP 10 and the function server 60 for realizing the functions explained above will be explained in detail referring to flow charts of FIGS. 20-23.

Figure 20:
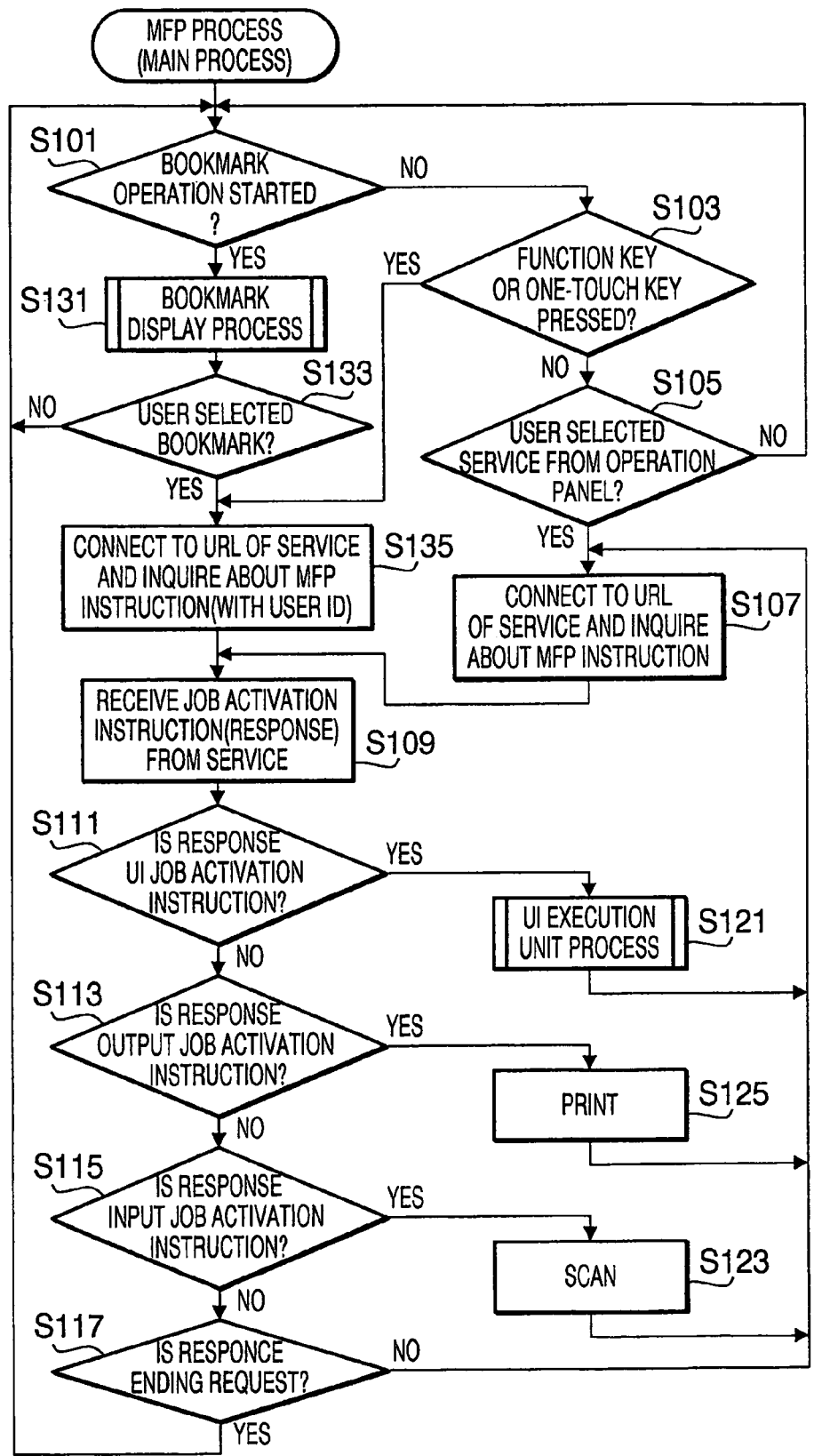
FIG. 20 is a flow chart showing a main process executed by the MFP in accordance with aspects of the present invention.

First, a main process executed by MFP 10 will be explained referring to FIG. 20. The main process of FIG. 20 is executed by the MFP 10 for executing the session shown in FIG. 14. Incidentally, FIG. 20 shows limited steps that are relevant to the principal part of the present invention, and thus steps unimportant for the understanding of the present invention are omitted.

At the start of the main process, the MFP 10 successively judges whether a bookmark operation has been started (S101), whether a one-touch key or function key has been pressed (S103) and whether a service has been selected by the user from the operation panel (S105). If the above judgments are all "NO" (S101: NO, S103: NO, S105: NO), the MFP 10 returns to S101 and waits for an operation by the user by repeating the loop of S101-S105. While other events occurring to the MFP 10 are also monitored in the loop of S101-S105, such events irrelevant to the principal part of the present invention are not shown in FIG. 20.

In the loop, the step S101 is executed for judging whether an operation for using the UI#1 (one of the three types of UIs explained in the chapter "<Bookmark Information of MFP and User-designated Parameter Information of Function Server>") has been performed by the user. The step S102 is executed for judging whether an operation for using the UI#2 or UI#3 has been performed by the user. The step S105 is executed for judging whether an operation for selecting a service from the screen according to the service definition information 522 received from the directory server 50 has been performed by the user.

Since the bookmark information is registered in the MFP 10 when the MFP 10 executes the session with the function server 60 at least once, the following explanation will be continued assuming that no bookmark information has been registered in the MFP 10 yet.

In the case where no bookmark information has been registered in the MFP 10, the user can not start the bookmark operation even using the three types of UIs (UI#1-UI#3) (S101: NO, S103: NO). However, the user can perform the operation of selecting a service from the screen which is displayed according to the service definition information 522 received from the directory server 50. In this case (S105: YES), the MFP 10 connects to the URL of the service selected in S105, inquires about an MFP instruction (S107), and receives a job activation instruction returned from the function server 60 in response to the inquiry (S109).

Subsequently, the MFP 10 successively judges whether the response received from the function server 60 is the UI job activation instruction (S111), the output job activation instruction (S113), the input job activation instruction (S115) or the ending request (S117). If the above judgments are all "NO" (S111: NO, S113: NO, S115: NO, 117: NO), the MFP 10 returns to S107 and waits for an instruction from the function server 60 by repeating the loop of S107-S117. While the MFP 10 can receive some type of response from the function server 60 and execute a process to deal with the response, such processes irrelevant to the principal part of the present invention are not shown in FIG. 20.

Since the function server 60 starting a service needs to obtain information on parameters necessary for the service, the function server 60 first transmits the UI job activation instruction to the MFP 10. If the response received in S109 is the UI job activation instruction (S111: YES), the MFP 10 activates the UI job (S121) and returns to the step S107.

While the details of the UI job will be explained later, parameter transfer from the MFP 10 to the function server 60 is executed in the UI job and the function server 60 is enabled to execute the service. In this state, when the function server 60 needs to receive data (as the target of processing) from the MFP 10, the function server 60 transmits the input job activation instruction to the MFP 10. The following explanation will be continued assuming that the English document translation service is executed by the function server 60.

If the response received in S109 is the input job activation instruction (S115: YES), the MFP 10 executes the scan of a document (S123). Actually, the scan is activated as the input job which is executed concurrently with this main process. After activating the input job, the MFP 10 returns to the step S107. In the input job activated in S123, a document is read by the scanner unit 103 and scan data obtained by the reading is transmitted to the function server 60. The function server 60 receives the scan data and executes the service (English document translation service) by activating software corresponding to the English document translation service out of the service software 632 stored in the service software storage unit 630. When the function server 60 has prepared data to be transmitted to the MFP 10 by executing the service, the function server 60 transmits the output job activation instruction to the MFP 10.

If the response received in S109 is the output job activation instruction (S113: YES), the MFP 10 executes the printing (S125). Actually, the printing is activated as the output job which is executed concurrently with this main process. After activating the output job, the MFP 10 returns to the step S107. In the output job activated in S125, text data (translated text) transmitted from the function server 60 is received and the text data is recorded (printed) on a sheet-like print medium by the recording unit 104. After the output job is completed, the ending request is transmitted from the function server 60.

If the response received in S109 is the ending request (S117: YES), the MFP 10 returns to the step S101, by which a sequence of communication steps (session) is finished. Thereafter the MFP 10 waits for an operation by the user by repeating the loop of S101-S105.

The explanation of steps S131 and S135 (executed when the judgment of the step S101 or S103 is "YES") is put off and a "UI execution unit process" which is activated as the UI job in the step S121 will be explained here for easy understanding of the main process.

Figure 21:
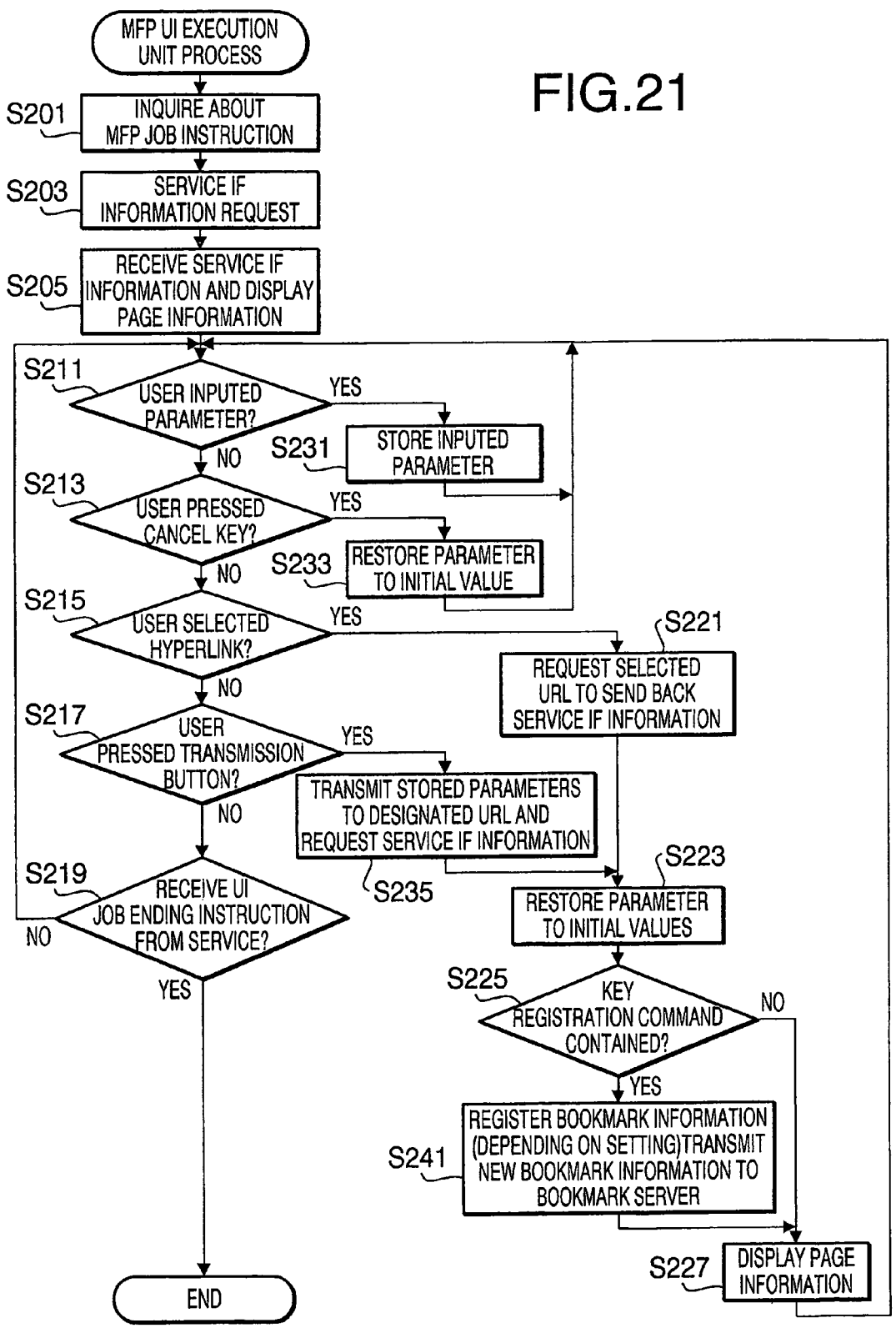
FIG. 21 is a flow chart showing a UI execution unit process executed by the MFP (MFP UI execution unit process) in accordance with aspects of the present invention.

FIG. 21 is a flow chart showing the UI execution unit process which is activated by the MFP 10 as the UI job in the step S121 of FIG. 20.

Referring to FIG. 21, the MFP 10 first inquires of the function server 60 about an MFP job instruction (S201). Since the response to the inquiry is not immediately returned from the function server 60, the MFP 10 transmits a service IF information request (requesting service IF information) to the function server 60 (S203), receives the service IF information as the response to the request, and displays page information based on the received service IF information on the display of the operation unit 102 (S205). In the page information displayed in S205, a hyperlink to the service use application page has been set.

Subsequently, the MFP 10 successively judges whether the user has inputted a parameter (S211), whether the user has pressed the cancel key (S213), whether the user has selected the hyperlink (S215), whether the user has pressed a transmission button (OK key) (S217), and whether the UI job ending instruction has been received from the service (function server 60) (S219). If the above judgments are all "NO" (S211: NO, S213: NO, S215: NO, 217: NO, 219: NO), the MFP 10 returns to S211 and waits for an operation by the user or the UI job ending instruction by repeating the loop of S211-S219.

Here, the user hoping to receive a new service refers to the page information displayed on the display of the operation unit 102 and selects the hyperlink to the service use application page. When the hyperlink is selected by the user (S215: YES during the loop of S211-S219), the MFP 10 requests the selected URL to send back service IF information (S221).

The MFP 10 receives the service IF information (service use application page) returned in response to the request (S223) and judges whether the received service IF information contains a key registration command (S225). In this case where the user has selected the hyperlink to the service use application page, no key registration command (explained in the chapter "<Details of Bookmark Information>") is transmitted from the function server 60. Therefore, the MFP 10 judges that the received service IF information contains no key registration command (S225: NO), displays page information based on the service IF information received in S223 (in this case, the service use application page (see FIGS. 16A-16E and FIGS. 17A-17D)) on the display of the operation unit 102 (S227), and returns to the step S211.

Subsequently, the user referring to the service use application page displayed on the display of the operation unit 102 inputs parameters or presses the cancel key when there is an inputting error, etc. When the user inputs a parameter (S211: YES during the loop of S211-S219), the MFP 10 stores the inputted parameter in a temporary buffer (S231) and returns to the step S211. When the user presses the cancel key (S213: YES during the loop of S211-S219), the MFP 10 restores the parameters (changed by the user) to initial values (S233) and returns to the step S211. In this input operation, the user sets the items shown in FIGS. 16A-16E and FIGS. 17A-17D, including the setting (selection) of one of the three types of UIs (UI#1-UI#3) explained in the chapter "<Bookmark Information of MFP and User-designated Parameter Information of Function Server>".

When the parameter input by the above input operation is finished, the user presses the transmission button (OK key) in order to send the inputted parameters to the function server 60. When the user presses the transmission button (OK key) (S217: YES during the loop of S211-S219), the MFP 10 transmits the parameters stored in the temporary buffer by S231 to the URL designated in the service IF information and requests the next service IF information (S235).

The MFP 10 receives the service IF information returned in response to the request (S223) and judges whether the received service IF information contains a key registration command (S225). As explained above, the key registration command is transmitted from the function server 60 when the transmission of parameters from the MFP 10 using the service use application page is finished, including a user ID generated by the function server 60, a URL for activating the service (service execution unit URL), a bookmark registration name entered in the input window of FIG. 17B (if any), etc. In this case, the MFP 10 judges that the received service IF information contains a key registration command (S225: YES), and executes a process for registering the bookmark information so that the bookmark information can be used with one of the three types of UIs (UI#1-UI#3) according to the settings made in the above input operation (S241). Depending on the settings of the MFP 10 made by the "remote bookmark setting function" of the remote management device 30 explained in the chapter "<Setting by Remote Management Device>", the MFP 10 further transmits the new bookmark information to the bookmark server 40 on the network (LAN 70) using its own export function (S241). By the step S241, a piece of bookmark information 122 including at least the "service execution unit URL" and the "user ID" is stored in the MFP 10 by registering it in one of the three types of tables shown in FIGS. 12A-12C. Subsequently, the MFP 10 displays page information based on the service IF information received in S223 on the display of the operation unit 102 (S227) and thereafter returns to the step S211.

Thereafter, when the UI job ending instruction is received from the service (function server 60) during the repetition of the loop S211-S219 (S219: YES), the MFP 10 ends the UI execution unit process of FIG. 21.

Figure 22:
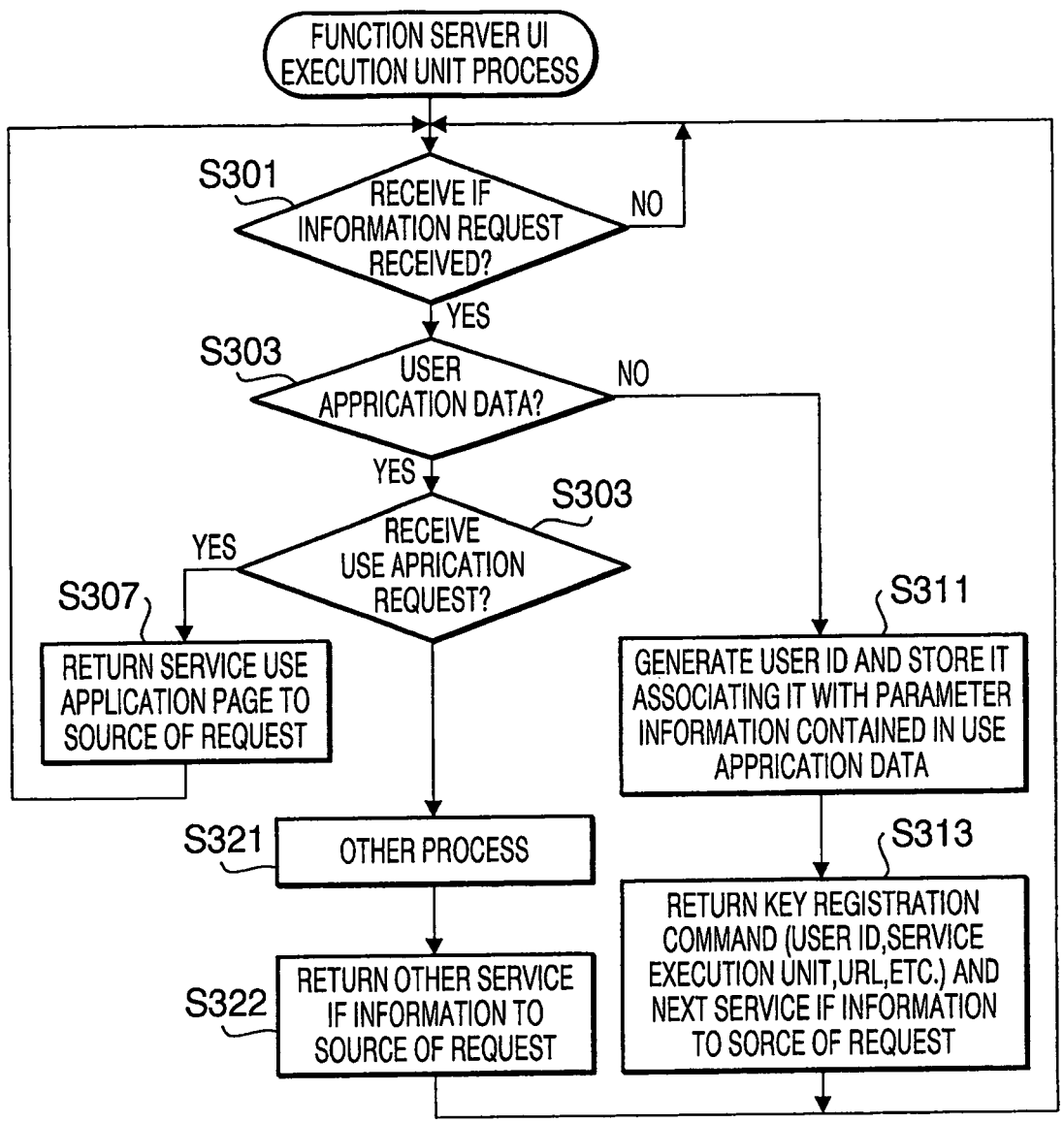
FIG. 22 is a flow chart showing a UI execution unit process executed by the function server (function server UI execution unit process) in accordance with aspects of the present invention.

While the MFP 10 executes the above UI execution unit process (MFP UI execution unit process), the function server 60 executes its own UI execution unit process (function server UI execution unit process) as shown in FIG. 22.

At the start of the function server UI execution unit process, the function server 60 waits until the service IF information request is received (S301: NO) by repeating the step S301. When the service IF information request is received (S301: YES), the function server 60 successively judges whether the received request (input) is the use application data (S303) or a service use application page request (S305).

If the received request (input) is the service use application page request (data transmitted in the step S221) (S305: YES), the function server 60 returns the service use application page to the source of the request (in this illustrative embodiment, the MFP 10) (S307) and thereafter returns to the step S301 to wait for the service IF information request again.

If the received request (input) is the use application data (data transmitted in the step S235) (S303: YES), the function server 60 generates a user ID and stores the generated user ID associating it with parameter information included in the use application data (S311). By the step S311, a new user ID is generated and the generated user ID and the parameters (included in the use application data) received from the MFP 10 are stored in the user-designated parameter storage unit 640 as a piece of user-designated parameter information 642 (see FIG. 13). Subsequently, the function server 60 returns the key registration command (including the user ID, service execution unit URL and bookmark registration name) and the next service IF information to the source of the request (in this illustrative embodiment, the MFP 10) (S313) and thereafter returns to step S301 to wait for the service IF information request again.

If the received request (input) is neither the use application data nor the service use application page request (S303: NO, S305: NO), the function server 60 executes a process corresponding to the received request or input (other process) (S321), returns other service IF information to the source of the request (in this illustrative embodiment, the MFP 10) (S323) and thereafter returns to the step S301 to wait for the service IF information request again. While various processes can be executed as the "other process" (S321), the explanation thereof is omitted here since such processes are irrelevant to the principal part of the present invention.

By the above UI execution unit processes of FIGS. 21 and 22 (steps S201-S241 and steps S301-S323), the bookmark information 122 is registered in the MFP 10 and the user-designated parameter information 642 is registered in the function server 60. The bookmark information 122 and the user-designated parameter information 642 will be used in processes executed when the judgment of the step S101 or S103 of FIG. 20 is "YES". The processes executed when the judgment of S101 or S103 is "YES" will be explained below.

When the UI#1 is selected by the user from the three types of UIs (UI#1-UI#3) explained in the chapter "<Bookmark Information of MFP and User-designated Parameter Information of Function Server>", the MFP 10 judges that the bookmark operation has been started (S101: YES) and executes a bookmark display process (S131). The details of the bookmark display process are shown in a flow chart of FIG. 23.

At the start of the bookmark display process, the MFP 10 successively makes the following judgments (S401, S403 and S407) based on the settings made by the remote bookmark setting function of the remote management device 30.

First, the MFP 10 judges whether the setting for prohibiting the use of remote bookmarks ("Remote Bookmarks Not Used") has been made (S401). If the setting for prohibiting the use of remote bookmarks has not been made (S401: NO), the MFP 10 judges whether the setting for using bookmarks of other devices ("Use Bookmarks of Other Devices") has been made (S403). If the setting for using bookmarks of other devices has been made (S403: YES), the MFP 10 requests other devices to send back their bookmark information by broadcasting the request and loads the bookmark information of other devices (e.g. the bookmark information 222 of the MFP 20) into its display buffer (S405, see FIG. 19A).

If the setting for using bookmarks of other devices has not been made (S403: NO), the MFP 10 judges whether the setting for using all the bookmark files registered in the bookmark server 40 ("Use All Bookmarks Registered in Bookmark Server") has been made (S407). If the setting for using all the bookmark files registered in the bookmark server 40 has been made (S407: YES), the MFP 10 connects to the bookmark server 40 and loads all the bookmark files (all pieces of bookmark information 422) from the bookmark server 40 into the display buffer (S409). On the other hand, if the setting for using all the bookmark files registered in the bookmark server 40 has not been made (S407: NO), the MFP 10 connects to the bookmark server 40 and loads a designated bookmark file (a designated piece of bookmark information 422) from the bookmark server 40 into the display buffer (S411).

When the setting for prohibiting the use of remote bookmarks has been made (S401: YES) or when the step S405, S409 or S411 is finished, the MFP 10 loads its own bookmark information 122 into the display buffer (S413).

By the above process, at least the bookmark information 122 of the MFP 10 is loaded into the display buffer, and depending on the settings, bookmark information of other devices (e.g. the bookmark information 222 of the MFP 20) or the bookmark information 422 (bookmark file(s)) of the bookmark server 40 is also loaded into the display buffer. The bookmark information loaded into the display buffer is displayed on the display of the operation unit 102 (S415). By the step S415, some registration names corresponding to some pieces of bookmark information are displayed on the display of the operation unit 102 (see FIG. 12A).

Figure 23:
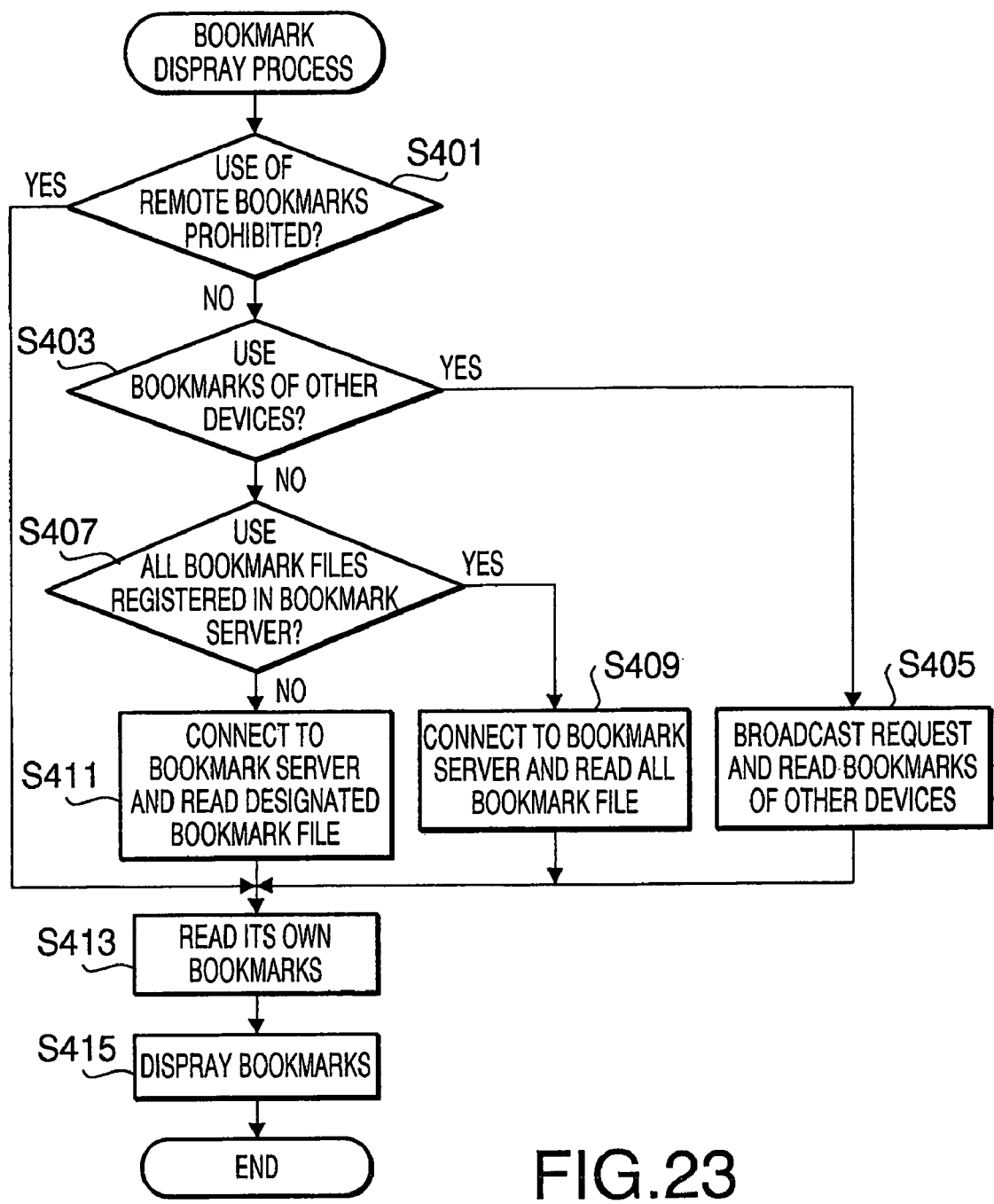
FIG. 23 is a flow chart showing a bookmark display process executed by the MFP in accordance with aspects of the present invention.

After the bookmark display process of FIG. 23 (S131 of FIG. 20) is finished, the user can perform an operation for selecting a piece of bookmark information or an operation for canceling the starting of the bookmark operation (selection of bookmark information). Subsequently, the MFP 10 checks whether the user has selected a bookmark (S133). If the user has selected no bookmark (S133: NO), the MFP 10 judges that the user has canceled the bookmark operation and returns to the step S101 to wait for an operation by the user by repeating the loop of S101-S105.

On the other hand, if the user has selected a piece of bookmark information (S133: YES), the MFP 10 advances to the step S135. Even when the UI#1 is not selected by the user from the three types of UIs (UI#1-UI#3) explained in the chapter "<Bookmark Information of MFP and User-designated Parameter Information of Function Server>" (S101: NO), if the setting for using the UI#2 or UI#3 has been made and a proper function key or one-touch key is pressed by the user (S103: YES), the MFP 10 advances to the step S135.

In the step S135, the MFP 10 extracts the service execution unit URL and the user ID from the selected bookmark information 122, connects to the URL of the service, and inquires about an MFP instruction by sending inquiry data to which the user ID is attached (S135).

The function server 60 receiving the inquiry data having the user ID can identify the parameters (necessary for the execution of the service) intended by the MFP 10 by searching the user-designated parameter storage unit 640 using the user ID as a key. Therefore, the function server 60 can immediately start a process corresponding to the execution of the service (e.g. transmission of the input job activation instruction) without the need of transmitting the service IF information for prompting the user to input parameters (service use application page) to the MFP 10. The process corresponding to the execution of the service has already been explained and thus repeated explanation thereof is omitted here.

As above, when a piece of bookmark information 122 is selected by the user using one of the three types of UIs (UI#1-UI#3), the user ID is sent to the service execution unit URL based on the selected bookmark information 122. The function server 60 can obtain the parameters necessary for the execution of the service based on the user ID and execute the service according to the parameters, without the need of prompting the user of the MFP 10 to input the parameters.

As described above in detail, by the image processing system in accordance with the illustrative embodiment of the present invention, the URL (location information) necessary for accessing the function server 60 ("service supply unit" in the present invention) for a service and the user ID convertible into the parameters necessary for the execution of the service (parameter information) are stored in the bookmark storage unit 120 as a piece of bookmark information. Therefore, by registering bookmark information 122 on frequently-used services, the user is allowed to request a desired service by selecting a piece of bookmark information 122 to let the MFP 10 ("image processing device" in the present invention) access the function server 60 using the location information included in the selected bookmark information 122, without the need of selecting a service from a variety of services supplied by the function server 60. Further, the user can receive the service according to the parameters, using the user ID (parameter information) included in the selected bookmark information 122, without the need of inputting various parameters (necessary for receiving the service) each time.

While a description has been given above of an illustrative embodiment in accordance with the present invention, the present invention is not to be restricted by the particular illustrative embodiment and a variety of modifications, design changes, etc. are possible without departing from the scope and spirit of the present invention described in the appended claims.

For example, while each piece of bookmark information 122 employed in the image processing system of the above illustrative embodiment contains a user ID as parameter information (since the function server 60 generates the user ID and stores the generated user ID and the parameters received from the MFP 10 in the user-designated parameter storage unit 640 as a piece of user-designated parameter information 642 so that the parameters (associated with the user ID) can thereafter be identified easily only by receiving the user ID from the MFP 10), it is also possible to employ a different type of bookmark information including the parameters themselves (instead of the user ID) as the parameter information. Even in this case, the trouble to the user is reduced in the same way as the above illustrative embodiment since the user can send the parameters to the function server 60 only by selecting a piece of bookmark information. However, since the data amount of the user ID is generally far smaller than that of the parameters, the method using the user IDs can reduce the load on the network. On the other hand, since the method employing the bookmark information including the parameters themselves can eliminate the need for the user-designated parameter storage unit 640, the method can be effective for systems that need to use a great number of user IDs in the method using the user IDs.

While the image processing system of the above illustrative embodiment includes one directory server 50 and one function server 60, such a configuration is only an example that has been provided for easy explanation and understanding of the present invention and thus other configurations may also be employed.

For example, the image processing system may include two or more directory servers 50 (e.g. a first directory server 50 transmitting the top service definition information 522 and a second directory server 50 transmitting the service definition information 522 on each category) or two or more function servers 60 (e.g. a first function server 60 transmitting the service IF information 622 and a second function server 60 executing services). The function server 60 executing services may also be implemented by two or more separate servers. For example, a function server 60 executing the session process and a function server 60 executing the job processes may be implemented by separate servers. It is also possible to let function servers 60 execute separate services (e.g. a first function server 60 executing service A, a second function server 60 executing services B-D, a third function server 60 executing services E and F, etc.). In this case, the service IF information 622 may be sent to the MFP 10 in various ways. For example, each function server 60 executing one or more services may send service IF information 622 corresponding to the services to the MFP 10, or a function server 60 for sending all the service IF information 622 to the MFP 10 may be provided separately from the function servers 60 executing the services.

Further, a directory server 50 and a function server 60 may be implemented by a single computer, or installed in one or more of MFPs forming an image processing system.

While the bookmark server 40 in the above illustrative embodiment is connected to the LAN 70, it is also possible to employ a bookmark server 40 connected to the WAN 90. In this case, the bookmark information can be shared even among distant MFPs (not in one local area) via the bookmark server 40 connected to the WAN 90.

While the reading and writing of the bookmark information as files from/to the storage unit 410 of the bookmark server 40 have been explained in the above illustrative embodiment as examples of the import and export of the bookmark information as files to/from the MFP 10/20, the device from/to which the files (bookmark information) are read/written (exported/imported) is not restricted to a storage device on the network. For example, it is possible to write (export) the bookmark information as files into a removable medium (e.g. memory card) mounted on the MFP 10, remount the removable medium on another MFP, and let the MFP read out (import) the bookmark information from the files stored in the removable medium.

What is claimed is:

1. An image processing system comprising:
an image processing device including at least one of an image reading unit configured to read an image and generate image data representing the image and an image printing unit configured to print an image represented by image data; and
a service supply unit provided on a network configured to be accessed by the image processing device using location information indicating a location on the network, and configured to execute a service regarding at least one of image data generated by the image reading unit and image data representing an image to be printed by the image printing unit in response to a request from the image processing device,
wherein the image processing device includes:
a parameter inputting unit configured to receive parameters inputted by a user, the parameters being data to be used to execute a service; and
a request sending unit configured to send a request to the service supply unit with the received parameters for executing the service;
wherein the service supply unit is configured to generate a user ID in response to the request sent from the image processing device, report the generated user ID to the image processing device, and store the generated user ID and the corresponding parameters received from the image processing device; and
wherein the image processing device further includes:
a bookmark information storage unit configured to store, for each service, a combination of the location information and the user ID reported from the service supply unit, as bookmark information; and
a selection unit configured to receive a selection, inputted by a user, to select a piece of the bookmark information stored in the bookmark information storage unit, and configured to request the service supply unit to execute a service corresponding to the piece of bookmark information selected by the user by accessing the service supply unit using the location information corresponding to the piece of bookmark information and transmitting the user ID corresponding to the selected piece of bookmark information to the service supply unit,
wherein the service supply unit is configured to extract parameters corresponding to the user ID received from the image processing device, based on the user ID stored and the parameters stored when the service supply unit generated the user ID,
wherein the service supply unit executes the service according to the extracted parameters and,
wherein the bookmark information storage unit is configured to store a plurality of pieces of bookmark information including two or more sets of different user IDs for the same service provided at one location, wherein each of different user IDs corresponds to a different configuration of the same service.

2. The image processing system according to claim 1, wherein:
the network is provided with:
a parameter input information transmission unit configured to transmit parameter input information to the image processing device to be used for allowing the user to input the parameters;
a parameter reception unit configured to receive the parameters transmitted from the image processing device;
a parameter storage unit configured to store the parameters received by the parameter reception unit and configured to associate the parameters with an identification (ID); and
a bookmark information transmission unit configured to transmit the bookmark information to the image processing device including a combination of the location information and the ID as the parameter information in response to the parameters being received by the parameter reception unit, and
the image processing device further includes:
a parameter input information reception unit configured to receive the parameter input information transmitted from the parameter input information transmission unit;
an input process unit configured to allow the user to input the parameters using the parameter input information received by the parameter input information reception unit;
a parameter transmission unit configured to transmit the parameters inputted through the input process unit to the parameter reception unit; and
a bookmark information reception unit configured to receive the bookmark information transmitted from the bookmark information transmission unit,
wherein the bookmark information storage unit of the image processing device is configured to store the bookmark information received by the bookmark information reception unit, and
wherein the service supply unit is configured to execute the service according to the parameters by reading out the parameters from the parameter storage unit based on the ID transmitted from the image processing device as the parameter information.

3. A server forming the image processing system of claim 2, comprising at least one of:
the parameter storage unit configured to store the parameters received by the parameter reception unit and associates the parameters with the ID;
the bookmark information transmission unit configured to transmit to the image processing device the bookmark information including a combination of the location information and the ID as the parameter information in response to the parameters being received by the parameter reception unit; and
the service supply unit configured to execute the service according to the parameters by reading out the parameters as the parameter information from the parameter storage unit based on the ID transmitted from the image processing device.

4. A non-transitory computer readable storage medium comprising computer-readable instructions that cause a computer to function as a server forming the image processing system of claim 2, wherein the server comprises at least one of:
the parameter storage unit configured to store the parameters received by the parameter reception unit and associates the parameters the ID;
the bookmark information transmission unit configured to transmit the bookmark information including a combination of the location information and the ID as the parameter information to the image processing device in response to the parameters being received by the parameter reception unit; and the service supply unit configured to execute the service according to the parameters by reading out the parameters as the parameter information from the parameter storage unit based on the ID transmitted from the image processing device.

5. The image processing system of claim 2, further comprising a server which includes at least one of:

the parameter input information transmission unit configured to transmit parameter input information to the image processing device to be used for allowing the user to input the parameters, to the image processing device;

the parameter reception unit configured to receive the parameters transmitted from the image processing device;

the parameter storage unit configured to store the parameters received by the parameter reception unit and associates the parameters with the ID; and the bookmark information transmission unit configured to transmit the bookmark information including a combination of the location information and the ID as the parameter information to the image processing device in response to the parameters being received by the parameter reception unit.

6. A non-transitory computer readable storage medium comprising computer-readable instructions that cause a computer to function as a server forming the image processing system of claim 2, wherein the server comprises at least one of:

the parameter input information transmission unit configured to transmit parameter input information, to be used for allowing the user to input the parameters, to the image processing device;

the parameter reception unit configured to receive the parameters transmitted from the image processing device;

the parameter storage unit configured to store the parameters received by the parameter reception unit and associates the parameters with the ID; and the bookmark information transmission unit configured to transmit the bookmark information including a combination of the location information and the ID as the parameter information to the image processing device in response to the parameters being received by the parameter reception unit.

7. The image processing system according to claim 1, wherein:

the network is provided with:
a parameter input information transmission unit configured to transmit parameter input information to the image processing device to be used for allowing the user to input the parameters;
a parameter reception unit configured to receive the parameters transmitted from the image processing device; and
a location information transmission unit configured to transmit the location information to the image processing device in response to the parameters being received by the parameter reception unit, and the image processing device further includes:
a parameter input information reception unit configured to receive the parameter input information transmitted from the parameter input information transmission unit;
an input process unit configured to allow the user to input the parameters using the parameter input information received by the parameter input information reception unit;
a parameter transmission unit configured to transmit the parameters inputted through the input process unit to the parameter reception unit; and
a location information reception unit configured to receive the location information transmitted from the location information transmission unit, wherein the bookmark information storage unit of the image processing device is configured to store as the bookmark information a combination of the location information received by the location information reception unit and the parameters inputted through the input process unit, and wherein the service supply unit is configured to execute the service based on the parameters transmitted from the image processing device as the parameter information.

8. A server forming the image processing system of claim 7, comprising at least one of:

the location information transmission unit configured to transmit the location information to the image processing device in response to the parameters being received by the parameter reception unit; and the service supply unit configured to execute the service according to the parameters based on the parameters transmitted from the image processing device as the parameter information.

9. A non-transitory computer readable storage medium comprising computer-readable instructions that cause a computer to function as a server forming the image processing system of claim 7, wherein the server comprises at least one of:

the location information transmission unit configured to transmit the location information to the image processing device in response to the parameters being received by the parameter reception unit; and the service supply unit configured to execute the service according to the parameters based on the parameters transmitted as the parameter information from the image processing device.

10. The image processing system of claim 7, further comprising a server which includes at least one of:

the parameter input information transmission unit configured to transmit parameter input information, to be used for allowing the user to input the parameters, to the image processing device;

the parameter reception unit configured to receive the parameters transmitted from the image processing device; and the location information transmission unit configured to transmit the location information to the image processing device in response to the parameters being received by the parameter reception unit.

11. A non-transitory computer readable storage medium comprising computer-readable instructions that cause a computer to function as a server forming the image processing system of claim 7, wherein the server comprises at least one of:

the parameter input information transmission unit configured to transmit parameter input information to the image processing device to be used for allowing the user to input the parameters;

the parameter reception unit configured to receive the parameters transmitted from the image processing device; and the location information transmission unit configured to transmit the location information to the image processing device in response to the parameters being received by the parameter reception unit.

12. The image processing system according to claim 1, wherein:
the image processing device further includes:
a registration name storage unit configured to store a registration name assigned to each piece of bookmark information; and
a registration name display unit configured to display the registration names stored in the registration name storage unit, and
wherein the selection unit of the image processing device is configured to allow the user to select a piece of bookmark information from the bookmark information stored in the bookmark information storage unit by allowing the user to select one of the registration names displayed by the registration name display unit.

13. The image processing system according to claim 1, wherein the selection unit of the image processing device is configured to allow the user to select a piece of bookmark information from the bookmark information stored in the bookmark information storage unit by allowing the user to operate a particular key of the image processing device.

14. The image processing system according to claim 1, wherein the image processing device further includes at least one of:
an export unit configured to read out the bookmark information stored in the bookmark information storage unit and configured to create a file including the bookmark information; and
an import unit configured to read out the bookmark information from a file including the bookmark information and configured to create the bookmark information in the bookmark information storage unit.

15. The image processing system according to claim 1, wherein the image processing device further includes a bookmark information readout unit configured to read out the bookmark information from the bookmark information storage units of other image processing devices connected to the image processing device via the network.

16. An image processing device comprising at least one of an image reading unit configured to read an image and generate image data representing the image and an image printing unit configured to print an image represented by image data, configured to form an image processing system in cooperation with a service supply unit provided on a network configured to be accessed by the image processing device using location information indicating a location on the network so as to execute a service regarding at least one of image data generated by the image reading unit and image data representing an image to be printed out by the image printing unit in response to a request from the image processing device,
wherein the image processing device comprises:
a parameter inputting unit configured to receive parameters inputted by a user, the parameters being data to be used to execute a service;
a request sending unit configured to send a request to the service supply unit with the received parameters for executing the service, wherein the service supply unit is configured to generate a user ID in response to the request sent from the image processing device, report the generated user ID to the image processing device, and store the generated user ID and the corresponding parameters received from the image processing device;
a bookmark information storage unit configured to store, for each service, a combination of the location information and the user ID reported from the service supply unit as bookmark information, wherein the bookmark information storage unit is configured to store a plurality of pieces of bookmark information including two or more sets of different user IDs for the same service provided at one location, wherein each of different user IDs corresponds to a different configuration of the same service;
a selection unit configured to receive a selection inputted by a user to select a piece of the bookmark information stored in the bookmark information storage unit, and configured to request the service supply unit to execute a service corresponding to the piece of bookmark information selected by the user by accessing the service supply unit using the location information corresponding to the piece of bookmark information and transmitting the user ID corresponding to the selected piece of bookmark information to the service supply unit.

\* \* \* \* \*